United States Patent [19]

Cottman

[11] Patent Number: 4,604,417
[45] Date of Patent: Aug. 5, 1986

[54] POLYMERIZABLE THIOESTER SYNERGISTS

[75] Inventor: Kirkwood S. Cottman, Akron, Ohio

[73] Assignee: The Goodyear Tire & Rubber Company, Akron, Ohio

[21] Appl. No.: 680,011

[22] Filed: Dec. 10, 1984

[51] Int. Cl.$^4$ .................. C08K 5/36; C08F 236/14; C08F 222/24; C08F 222/38; C07C 149/437; C07C 149/41; C07C 149/40; C07C 149/273

[52] U.S. Cl. .................................. 524/199; 524/198; 524/213; 524/217; 524/289; 524/302; 524/304; 525/343; 525/351; 526/288; 526/289; 560/9; 560/17; 560/18; 560/148; 560/152; 560/153

[58] Field of Search ............... 525/343, 351; 526/288, 526/289; 524/198, 199, 213, 217, 289, 302, 304; 560/9, 18, 17, 148, 153, 152

[56] References Cited

U.S. PATENT DOCUMENTS

| | | | |
|---|---|---|---|
| 2,416,052 | 2/1947 | Gribbins | 560/152 |
| 2,519,755 | 8/1950 | Gribbins | 524/103 |
| 3,100,748 | 8/1963 | Richards et al. | 526/289 |
| 3,268,494 | 8/1966 | Herbert et al. | 526/289 |
| 3,305,580 | 2/1967 | Homberg et al. | 524/302 |
| 3,621,051 | 11/1971 | Hechenbleikner et al. | 524/289 |
| 3,714,122 | 1/1973 | Kline | 524/291 |
| 3,767,628 | 10/1973 | Kline | 524/217 |
| 3,849,373 | 11/1974 | Siegle et al. | 525/328.2 |
| 3,962,187 | 6/1976 | Kline | 524/291 |
| 4,298,522 | 11/1981 | Tamura et al. | 526/288 |
| 4,504,628 | 3/1985 | Johnson | 524/199 |

FOREIGN PATENT DOCUMENTS 0079855 5/1983 European Pat. Off. .
46-18489 5/1971 Japan .

*Primary Examiner*—Veronica P. Hoke
*Attorney, Agent, or Firm*—D O Nickey

[57] ABSTRACT

There are disclosed polymerizable thioester synergists which have utility in enhancing the antioxidative activity of phenolic and amine stabilizers. The invention is also concerned with the thioesters themselves, their use in oxidizable organics, their combination with polymerizable and/or conventional antioxidants, and with polymers which contain these thioesters as physical admixtures or segmeric units of the polymer.

8 Claims, No Drawings

POLYMERIZABLE THIOESTER SYNERGISTS

TECHNICAL FIELD

This invention is concerned with polymerizable thioester synergists and to antioxidant systems which employ thioester synergists. More particularly, this invention relates to organic compositions stabilized against oxidative degradation by a stabilizing system comprising a novel thioester compound and phenolic and/or amine antioxidant(s). Vulcanized and unvulcanized polymers containing these novel thioesters as segmeric units have demonstrated a synergistic effect with phenolic and amine antioxidants.

BACKGROUND ART

It is well known that organic materials such as plastics, rubbers, lubricating oils, etc. are prone to oxidation and deterioration in the presence of oxygen. Oxidation of organic materials causes the loss of those intrinsic properties characteristic of the organic material. With a view to preventing deterioration, a variety of antioxidants and antiozonants have been developed; however, these stabilizers fail to prevent completely the deterioration of the desired properties of the materials to which they are added. Thus, those skilled in the art are constantly searching for new and more effective stabilizing systems which are useful for the protection of polymers and other organic materials.

Synergists have been known in the art for some time. See for example U.S. Pat. No. 3,492,336 which discloses a novel tetra-alkyl thioethyl thiodisuccinate compound for use with phenolic type antioxidants in the stabilization of polyolefins.

U.S. Pat. No. 4,254,020 discloses compounds such as 2,12-dihydroxy-4,10-dithia-7-oxatridecamethylene bis[3-(dodecylthio)propionate] as a synergist with phenolic antioxidants.

In U.S. Pat. No. 3,398,116 a thiocarboxylic acid thioether ester is used in combination with a limited group of phenolic antioxidants to stabilize poly-alphaolefins against oxidative degradation.

U.S. Pat. No. 3,758,549 discloses polyalkanol esters of alkylthio-alkanoic acids as synergists with phenolic antioxidants and U.S. Pat. Nos. 3,666,716 and 3,505,225 disclose derivatives of diphenylamine and phenylnaphthylamines as antioxidants with dialkyl 3,3'-thiodipropionates as a synergist. U.S. Pat. No. 3,450,671 discloses polyolefin compositions stabilized with dialkyl 3,3'-thiodipropionate and a polyphenol.

An article by R. Chandra, *Polymer*, Vol. 24, February 1983 discloses styrene-butadiene copolymers stabilized with a synergist mixture of the antioxidant 3,5-di-t-butyl-4-hydroxybenzylmercaptan in combination with 1,1,5-triphenyl-2-s-(3',5'-di-t-butyl-4'-hydroxy)benzyl-iso-4-thiobiuret bound to the polymer as a synergist.

The art of using a combination of antioxidants has been utilized by the industry, and such stabilizing systems are often highly effective. Conventionally used synergists are normally added to the material to be stabilized during a mixing operation. It was thought that for a compound to exhibit synergistic properties with an antioxidant or antiozonant it would require a certain amount of mobility within and about the polymer structure. The present invention has unexpectedly discovered that synergists can be attached or "bound" to a polymer (a segmeric unit of the polymer) and still exhibit synergistic properties with a phenolic or an amine stabilizer. Further, it has been discovered that bound synergists demonstrate activity with what is now known in the art as bound antioxidants. This is highly unexpected and contrary to numerous and various teachings in the art. It has been discovered that the particular compounds of this invention can be copolymerized with other monomers to form a polymer that has chemically attached to it, via a covalent bond, a moiety which can synergistically enhance the antidegradative properties of phenolic and amine antioxidants.

It has also been discovered that the compounds of this invention can be grafted onto the polymeric backbone using a technique similar to that described in U.S. Pat. No. 4,155,955 which is herein incorporated by reference.

The majority of the synergistic stabilizers to date have been used in conjunction with phenolic antioxidants since use with amine antioxidants has not demonstrated synergistic properties. It was felt that synergism was simply overpowered by the excellent stabilizing properties of compounds such a N,N'-p-phenylenediamine. In this regard, it is surprising that the compounds of the instant invention demonstrate synergistic activity with amine type antioxidants. As a result of these discoveries, it has been found that the combined use of the compounds of this invention and an antioxidant brings about an unexpectedly powerful antioxidative effect. None of the cited patents or other literature in the art has disclosed or even suggests the synergist compounds disclosed in this invention.

DISCLOSURE OF THE INVENTION

The present invention relates to a stable organic composition which comprises an oxidizable diene containing polymer, a phenolic and/or amine antioxidant and a compound selected from formulae I–XIII:

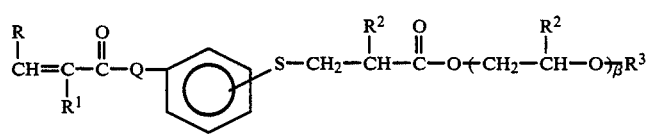

-continued

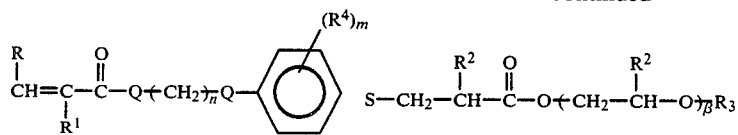 II

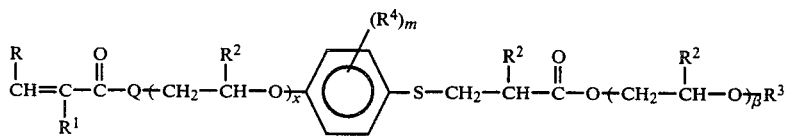 III

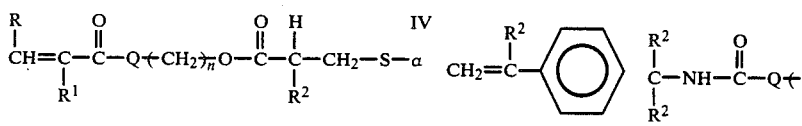 IV 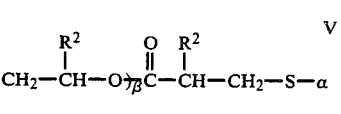 V

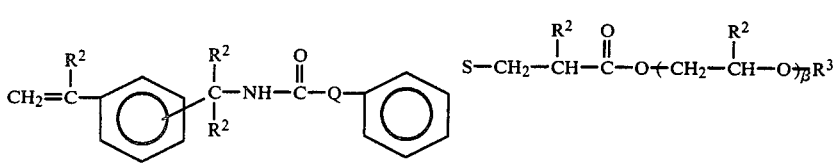 VI

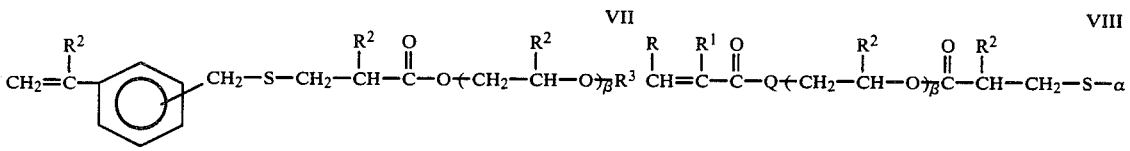 VII VIII

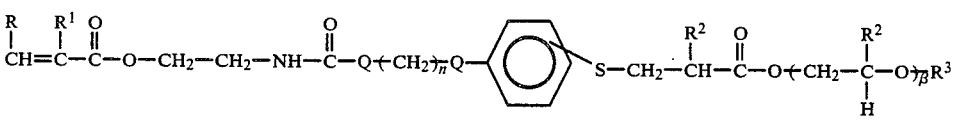 IX

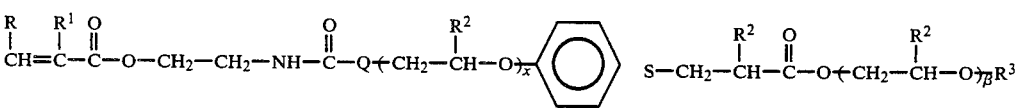 X

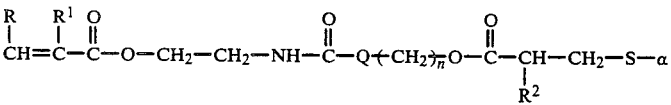 XI

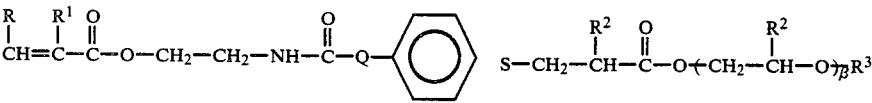 XII wherein

R is selected from hydrogen, methyl or phenyl radicals;

$R^1$ is selected from hydrogen, methyl or ethyl radicals;

$R^2$ is selected from hydrogen or methyl radicals;

$R^3$ is selected from hydrogen, alkyl radicals of 1 to carbon atoms, phenyl and substituted phenyl radicals;

$R^4$ is an alkyl radical of 1 to 3 carbon atoms;

Q may be the same or different divalent radical selected from —O— or —NH—;

$\beta$ is 0 or a whole number from 1 to 20;

n is a whole number from 2 to 20;

m is 0 or 1 or 2;

x is a whole number from 1 to 20;

$\alpha$ is a monovalent radical selected from alkyl radicals of 1 to 30 carbon atoms, the radical

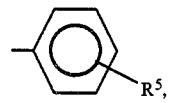

or the radical

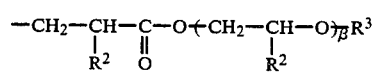

wherein $R^2$, $R^3$ and $\beta$ are defined as above and $R^5$ is selected from hydrogen, hydroxyl and alkyl radicals of 1 to 10 carbon atoms.

The present invention also relates to the compounds expressed by formulae I–XII, to synthetic polymers prepared from polymerizable comonomers and a compound selected from formulae I–XII and to polymers that have grafted onto the polymeric backbone a compound of formulae I–XII. The present invention also relates to vulcanized polymers containing compounds expressed in formulae I–XII.

These compounds exhibit their novel properties when combined with a variety of stabilizers known as phenolics and amines, many of which are commercially available and some of which are the subject of patents.

Generally speaking, the thioesters of the instant invention contain a polymerizable moiety and a synergistic moiety. It has been determined and will be demonstrated infra that the relationship of the particular atoms is critical to the viable functioning of the synergist.

DETAILED DESCRIPTION OF THE INVENTION

Typical of the phenolic antioxidants with stabilizing properties that are improved by the addition of compounds of the present invention are phenolic compounds having the general formula:

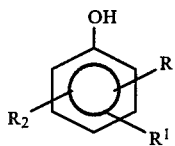

wherein R is a tertiary alkyl radical having 4 to 8 carbon atoms, a cycloalkyl radical having 5 to 12 carbon atoms, or an aralkyl radical having 7 to 12 carbon atoms, and wherein $R^1$ and $R^2$ are alkyl radicals having 1 to 12 carbon atoms, cycloalkyl radicals having 5 to 12 carbon atoms, or aralkyl radicals having 7 to 12 carbon atoms; or polyphenolics of the formula:

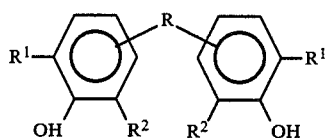

wherein R is an alkylidine radical having 1 to 4 carbon atoms, the group —O—, or the group —S—, and wherein $R^1$ and $R^2$ are alkyl radicals having 1 to 12 carbon atoms, cycloalkyl radicals having 5 to 12 carbon atoms, or aralkyl radicals having 7 to 12 carbon atoms. Preferably at lease one of $R^1$ and $R^2$ is a tertiary alkyl radical having 4 to 8 carbon atoms and is in a position ortho to the hydroxyl group.

Other antioxidants such as:

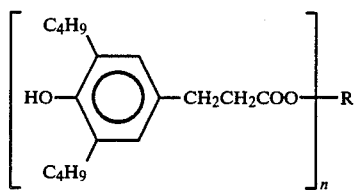

are useful with the synergists of this invention wherein n is an integer from 1 to 4 and R is an alkyl radical having 8 to 20 carbon atoms, an alkylene radical having 2 to 6 carbon atoms, a thiodialkylene radical wherein each alkylene radical has 2 to 6 carbon atoms, a trivalent radical derived from a straight or branched chain hydrocarbon having 3 to 8 carbon atoms, or a tetravalent radical derived from a straight or branched chain hydrocarbon having 4 to 8 carbon atoms.

Specific phenolic antioxidants applicable in the present invention include:
2,6-di-tert-butyl-4-methylphenol
2,4,6-tri-tert-butylphenol
2,2'-methylene-bis-(4-methyl-6-tert-butylphenol)
2,2'-thio-bis-(4-methyl-6-tert-butylphenol)
4,4'-thio-bis-(3-methyl-6-tert-butylphenol)
4,4'-butylidene-bis-(6-tert-butyl-3-metylphenol)
Styrenated phenol
Butylated Octylated Phenol
Butylated-methylstyrenated phenol
Styrenated butylated m, p-cresol
4,4'-methylenebis (2,6-di-tert-butylphenol)
2,2'-methylenebis[4-methyl-6-(1-methylcyclohexyl)-phenol]
2,5-diamylhydroquinone
2,6-ditert-butyl-4-butylthiophenol
Butylated reaction product of p-cresol and dicyclopentadiene
Tetrakis[methylene 3-(3,5-di-tert-butyl-4-hydroxyphenyl)propionate]methane
1,3,5-trimethyl-2,4,6-tris(3,5-di-tert-butyl-4-hydroxybenzyl)benzene
Thiodiethylene bis[3-(3,5-di-tert-butyl-4-hydroxyphenyl)propionate]
Octadecyl 3-(3,5-di-tert-butyl-4-hydroxyphenyl)propionate
2,6-bis(1-phenylethyl)-4-(1-phenylethylthio) phenol Typical of the amine antioxidants with stabilizing properties that are improved by the addition of compounds of the present invention are the naphthylamines, diphenylamine derivatives, quinolines, paraphenylenediamines and the blended amines. A diphenylamine derivative especially useful is the alkylated diphenylamine known as Wingstay TM 29 (Trademark of The Goodyear Tire & Rubber Company). The quinoline antidegradants are of two types—the polymerized and the non-polymerized dihydroquinolines and the substituted dihydroquinolines. Numerous paraphenylenediamines have been produced and used as antiozonants. Representative examples are Wingstay TM 300 and 100, Flexzone TM 3C and 6H (products of Uniroyal, Inc.).

Another class of antioxidant that is useful with the compounds of the instant invention are the polymer bound antidegradants. Most recently, numerous investigators have studied the stabilizing properties of polymers that have as one of their segmeric units an antioxidant functionality. A more complete discussion of suitable polymeric antidegradants useful with the compounds of the present invention can be found in U.S. Pat. Nos. 3,984,372, 3,962,187, 3,953,402, 3,953,411, 4,097,464, 4,152,319 and 3,658,769. The compounds of the present invention have as one of their characteristic properties the ability to vastly improve the effect of numerous compounds which are presently used as antioxidants for organic materials. Thus, while the compounds of the present invention may be considered as stabilizers in their own right, their properties are such that they would be more conventionally classified as "synergists", in that, when combined with known stabilizers they exhibit the ability to increase stabilization to a degree far exceeding that which would be expected from the additive properties of the individual components.

The compounds of the instant invention may be used with stabilizers (i.e. antioxidants, U.V. absorbers and antiozonates) at a weight ratio of from 1:50 to 50:1 synergist to stabilizer. However the maximum effectiveness of the stabilizer is usually achieved when a compound of the instant invention is used with a stabilizer at ratios varying from 1:10 to 10:1. The optimum ratio of a given combination varies depending on the organic material to be stabilized, the stabilizers used and the environment to which the organic material is to be exposed. It should be appreciated that one or more compounds of the instant invention may be combined with one or more stabilizers of different types, (i.e. phenolics and amines).

The stabilization system according to the present invention (synergist plus stabilizer) can be added to said organic materials in known ways. For instance, it can be combined with the organic material either after dilution with a solvent, while in latex form, or directly as is. More preferably, the compounds of the instant invention are added to a polymerization recipe so that the synergistic functionality becomes covalently bonded or attached to the polymeric backbone through the polymerizable moiety of the synergist. It has also been found advantageous to prepare masterbatches of highly loaded polymers so as to allow for mixing with unmodified polymers to achieve the desired and required level of stabilization system. It is also possible to graft the compounds of the instant invention to polymers alone or in combination with other reactive stabilizers known to the art. This may be accomplished on polymers in latex form, in solution or during mastication.

These polymers, whether liquid or solid, have a special advantage in that the age resistant portion (stabilization system) is not extractable, and therefore the polymeric compositions are highly resistant to aging even after repeated exposure to aqueous detergent solutions or dry-cleaning fluids. This feature is especially significant where polymers are used in foam backings for rugs and where polymers are used in solution or latex form to treat fabrics, since such products are often exposed to aqueous detergent solutions or dry-cleaning fluids. This feature is also significant where factors such as contact with lubricating oils or exposure to high vacuum conditions are a consideration. The instant invention will also have utility in coating applications such as paints.

Polymers, oils, resins and waxes subject to deterioration that can be conveniently protected by the stabilization system described herein, either as physical admixtures or mixing with masterbatches, include substituted and unsubstituted, saturated and unsaturated, natural and synthetic polymers, oils and waxes. The oxidizable natural polymers include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cylooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are α-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerizable product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene and polyester.

It has been found that addition of the synergist and the stabilizer (stabilization system) to organic materials in the range from 0.1 to 10.0 parts per hundred of organic material by weight will effectively protect the organic material from deterioration. As described above, the stabilization system according to the present invention comprises the novel compounds expressed by general formulae I through XII combined with a known stabilizer. The stabilization system of the present invention demonstrates activity superior to that of most conventional systems prepared by combining two or more commercial stabilizers. In addition, the instant invention has the added benefit of a synergist that cannot be extracted by solvents. Further, the synergists of the instant invention when forming part of the polymeric backbone will not migrate and therefore will not be lost to volatility or bloom.

BEST MODE FOR CARRYING OUT THE INVENTION

Preparation of Synergists

The novel compounds of this invention are generally prepared by reacting an acrylate with a thiol, thereafter reacting the resultant product with a compound that contains a polymerizable moiety. The following is a more specific reaction scheme for compounds of the invention and certain control or comparative compounds. All parts are parts by weight unless otherwise noted.

EXAMPLE

I. Preparation of 2-hydroxyethyl 3-(dodecythio)-2-methylpropionate

To a flask equipped with a stirrer, water condenser and thermometer was charged 34 grams of 2-hydroxyethyl-methacrylate, 50 grams of dodecanethiol, 4 drops of Triton TM B (Trademark for a 40% solution of benzyltri-methylammonium hydroxide in methanol) and 1 pellet of KOH. The temperature rose from 20° C. to 58° C. Gas chromatography indicated the reaction was 99% complete after 20 minutes.

II. Preparation of 2-[3-dodecylthio)-2-methylpropionyl-oxy]ethyl methacrylate—Compound of Structural Formula IV 50 grams of the product from Example I, 37 mls. of triethylamine and 75 mls of toluene were charged to a reaction vessel. Twenty-two grams of methacryloyl chloride was added slowly with stirring below 20° C. The product was washed with water several times after the reaction was determined to be complete by gas chromatography. The volatiles were removed by distilling the product to a pot temperature of 210° C. and column temperature of 105° C. at 2.6 mm Hg.

III. Preparation of 2-hydroxyethyl 3-(n butylthio)-2-methylpropionate

To the reactor described in Example I was charged 55 grams of 2-hydroxyethylmethacrylate, 37 grams of n-butanethiol, 1.5 grams of Triton TM B and 3 pellets of KOH. The flask contents were reacted at 40° to 50° C. until the reaction was complete by gas chromatography analysis. The yield was theoretical.

IV. Preparation of 2-[3-(butylthio)-2-methylpropionyloxy]ethyl methacrylate—Compound of Structural Formula IV 40 grams of the product from Example III, 25 mls of triethylamine, 75 mls of toluene and 50 mls of tetrahydrofuran were charged to a flask. Twenty grams of methacryloyl chloride was then added over a 10 minute period below 20° C. After one hour of reaction time the reaction was complete. The product was washed several times with water and then the volatiles were removed by distilling at 92° C. and 15 mm Hg.

V. Preparation of methyl 3-(2-hydroxyethylthio) propionate 47 grams of methylacrylate, 55 mls of methanol and 0.75 grams of KOH (dissolved in 8 mls water) were charged to the reactor of Example I. 39 grams of 2-mercaptoethanol was added at 33° C. over a 50 minute period. After reacting for two additional hours at 40° C., the volatiles were removed under vacuum at 76° C. The product was further dried with $Na_2CO_3$.

VI. Preparation of methyl 3-(2-methacryloyloxyethylthio) propionate—Control/Comparative Compound 40 grams of the product prepared in Example V, 30 grams triethylamine and 50 mls of tetrahydrofuran were charged to a reactor. Below 40° C. was then added slowly 27 grams of methacryloyl chloride. The product was washed several times with water after gas chromatography indicated the reaction was complete. The volatiles were removed with a rotary evaporator. The structure was confirmed by NMR.

VII. Preparation of methyl 3-(4-hydroxyphenylthio) propionate 66 grams of 4-mercaptophenol, 100 mls tetrahydrofuran and 10 drops of Triton TM B were charged to a reactor. Fifty-one grams of methylacrylate was added slowly over a 30 minute period below 50° C. TLC (thin layer chromatography) was used to determine when the reaction was complete. The volatiles were removed on a rotary evaporator.

VIII. Preparation of methyl 3-(4-methacryloyloxyphenylthio) propionate—Compound of Structural Formula I 30 grams of the product prepared in Example VII, 50 mls tetrahydrofuran, 30 grams triethylamine and 100 mls benzene were charged to a reactor. Sixteen grams of methacryloyl chloride was added over a 15 minute period below 33° C. The product was washed with water when TLC analysis showed the reaction was complete. The volatiles were removed by a rotary evaporator.

IX. Preparation of 2-hydroxyethyl 3-[(2-methoxycarbonyl)ethylthio]-2-methyl propionate 46 grams of methyl 3-mercaptopropionate, 50 grams hydroxyethylmethacrylate, 20 drops of Triton TM B and 3 pellets of KOH powder were charged to a reactor. The mixture was reacted at 70° C. to 85° C. until gas chromatography indicated the reaction was complete.

X. Preparation of 2-(methacryloxy)ethyl-3[(2-methoxycarbonyl)ethylthio]2-methyl propionate—Compound of Structural Formula VIII 40 grams of the product prepared in Example IX, 60 mls tetrahydrofuran, 50 mls toluene and 33 mls of triethylamine were charged to a reactor. Twenty grams of methacryloyl chloride was then added over a 5 minute period below 38° C. The product was washed with water after TLC analysis showed the product had formed. The volatiles were removed at 65° C. on a rotary evaporator after adding 0.05 parts of BHT to avoid possible product polymerization. The structure was confirmed by NMR.

XI. Preparation of methyl 3-(6-hydroxyhexylthio) propionate 25 grams of 5-hexene-1-ol, 13.8 grams methyl 3-mercaptopropionate and 0.25 grams AIBN were charged to a small bottle and agitated on a bottle roller for 2½ hours at 70° C. The product was then distilled to a pot temperature of 155° C. and a column temperature of 70° C. at 7 mm Hg to remove the unreacted components.

XII. Preparation of methyl 3-(6-methacryloylhexylthio) propionate—Control/Comparative Compound 20 grams of the product prepared in Example XI, 14 grams triethylamine and 50 grams of tetrahydrofuran were charged to the reactor described in Example I. Below 32° C. was added 13.4 grams of methacryloyl chloride. The reactor contents were allowed to react 30 minutes longer and then diluted with hexane and washed with water. The volatiles were removed on a rotary evaporator. The product weight was 25 gms.

POLYMERIZATION OF SYNERGISTS

The aforementioned monomeric synergists of this invention and known monomeric age resistors may be polymerized by well known free radical emulsion polymerization techniques with one or more comonomers that are known to polymerize in free radical initiated polymerization systems. Some adjustments in the polymerization recipe and/or conditions may be necessary to obtain a satisfactory rate of polymer formation. Adjustments which may be necessary in the polymerization conditions to improve polymerization rates include adjusting the temperature of polymerization and/or adjusting the initiator level and/or adjusting the level of activator ingredients and/or changing the level of the molecular weight modifier. Solvents may also be required to obtain adequate solubility of the monomers with each other as well as to solubilize other ingredients when required. Some solvents, such as methyl ethyl ketone, dichloromethane, THF or isopropyl alcohol, can be used to advantage. These adjustments, where necessary, are to counteract the inhibitory effect of the monomeric age resistor and/or synergist and to insure its solubility in the polymerization system.

Examples of free radical initiators that are useful in the practice of this invention are those known as "Redox" initiators, such as appropriate combinations of chelated iron salts, sodium formaldehyde sulfoxylate and organic hydroperoxides such as cumene and paramenthane hydroperoxides. Other initiators such as azoisobutyronitrile (AIBN), benzoyl peroxide, hydrogen peroxide and potassium persulfate may also be used, depending on the particular polymerization recipe.

The monomeric age resistors and/or synergists used in the practice of this invention have certain chemical characteristics which promote their use in polymerization processes initiated by free radicals. By "free radical initiated systems" is meant systems wherein free radicals are generated by any of various processes such as thermal decomposition of various persulfate, perborate, peroxide, azo or azonitrile compounds; induced (catalytic or "Redox" promoted) decomposition of various persulfate, peroxide or hydroperoxide compounds and generation of free radicals by exposure of the system to high energy radiation such as radiation from a radioactive source or ultraviolet light. Such systems are very well known in the art and are widely used commercially, e.g., in the preparation of SBR (styrene/butadiene copolymers).

Very effective free radical polymerization initiators when used under appropriate conditions, are compounds such as t-butyl hydroperoxide and paramenthane hydroperoxide, and even hydrogen peroxide. These compounds perform very effectively when used in polymerization recipes containing appropriate levels of supporting ingredients. By "supporting ingredients" is meant those materials often referred to as activators in emulsion, or other systems, where required. U.S. Pat. No. 3,080,334 describes some of these materials at column 5, lines 20-26. Such materials can also be referred to as catalyst activators. The term "Redox Polymerization" is often used where the complete initiation system includes a Redox system, i.e., reducing agents and oxidizing agents in a proportion that yields polymerization initiating species. These initiator systems are well known in the art. Various organic initiators are described by J. Brandrup and E. H. Immergut, Polymer Handbook (John Wiley & Sons), 1965, pages II-3 to II-51.

Various initiator system components are described at column 4, lines 14 to 32, in U.S. Pat. No. 3,080,334. The monomeric synergists of the present invention can be used in emulsion polymerization systems to produce polymers of numerous and varying types.

The principles of emulsion polymerization are discussed in references such as "Synthetic Rubber" by G. S. Whitby, Editor-in-Chief, John Wiley and Sons, 1954, particularly Capter 8, and "Emulsion Polymerization" by F. A. Boxey et al, Vol. IX of "High Polymers", Interscience Publishers Inc. 1955. Some specialized applications of these principles are indicated in U.S. Pat. Nos. 3,080,334; 3,222,334; 3,223,663; 3,468,833 and 3,099,650.

Representative of comonomers that can be used with the monomeric synergists of this invention are polymerizable unsaturated hydrocarbons, both substituted and unsubstituted, including conjugated diene monomers, such as butadiene-1,3; 2-chlorobutadiene-1,3; isoprene; 2-ethylbutadiene-1,3; 2,3-dimethyl butadiene-1,3; piperylene; and hexadienes and copolymerizable monoolefins including vinyl and vinylidene monomers such as styrene, α-methylstyrene, dimethylstyrene, divinyl benzene, vinyl chloride, vinyl acetate, vinylidene chloride, methylmethacrylate, ethylacrylate, glycidyl methacrylate, the vinylpyridines including 2-vinyl pyridine, 5-methyl-2-vinyl pyridine, 4-vinyl pyridine and 2-vinyl-5-ethyl pyridine, (3-isopropenyl-α,α-dimethyl-benzyl isocynate, acrylonitrile, methacrylonitrile, methacrylic acid, acrylic acid, itaconic acid, isocyanatoethyl-methacrylate and 2-hydroxyethyl-methacrylate. Also useful are the polymerizable stabilizers known in the art such as those described in U.S. Pat. Nos. 3,658,789, 3,767,628 and 4,213,892.

In these polymerizations, the monomer charge weight ratio is normally from 0.10/99.9 to 50/50 monomeric stabilizing system (synergist or synergist plus antioxidant) to comonomers (i.e. styrene and butadiene). The ratio may be as high as 60/40 or even higher. A charge ratio of 0.5/99.5 to 20/80 is preferred. Ratios will vary depending on the amount of synergist and age resistor desired to be bound and on the reactivity ratios of the monomers in the particular polymerization system used and whether or not a masterbatch is desired. It should be appreciated that the stabilizing system may contain only synergist and that the compounds of this invention may be homopolymerized and blended with another polymer to achieve the desired level of protection or copolymerized only with an antioxidant and blended with another polymer.

The polymers resulting from the free radical polymerizations of monomeric systems containing the monomeric synergists of the present invention will contain at least one segmeric unit based on the formulae I–XII in that the unsaturated portion (>C=C<) has become part of the polymeric backbone.

GRAFTING OF SYNERGISTS

As previously mentioned the compounds of this invention can also be grafted onto a polymer. The following examples illustrate this grafting technique.

XIII. Grafting Onto NBR-Compound of Structural Formula IV

Fifty-three grams of an NBR polymer (19% solids) was placed in a $1.2 \times 10^{-4}$ m$^3$ (4 oz.) bottle. To the reaction bottle was added a solution containing 3 grams of the monomer prepared in Example II, emulsified in 5 g. of a saturated potassium oleate solution (surfactant). The bottle was purged with nitrogen and then injected with 3.3 mls. of a 3% AIBN in toluene/THF (0.1 g AIBN) solution. The bottle was rotated in a 70° C. water bath for 16 hours and then coagulated in isopropyl alcohol. The polymer product was extracted with methanol. Elemental analysis showed the sample contained 1.85% sulfur. Hence the NBR product contained 21.9 parts by weight of 2-[3-dodecylthio)-2-methylpropionyloxy]-ethylmethacrylate grafted onto it.

XIV. Grafting Onto NBR-2-[3-(butylthio)-2-methyl propionyloxy]ethyl methacrylate Same as example XIII except that 3 grams of the monomer prepared in Example IV was emulsified with 5 grams of 10% Igepal TM CO-850 (a polyethoxy surfactant). The NBR polymer after coagulation and extraction was found to contain 1.78% sulfur. The resulting polymer product thus contained 21.1 parts by weight of the monomer prepared in example IV grafted onto its structure.

XV. Grafting Onto SBR

Same as Example XIII except 40 grams of an SBR1006 (25% solids) type latex (a styrene butadiene copolymer hot emulsion polymerization with 23.5% styrene content) was used. The extracted polymer was found to contain 1.85% by weight sulfur by elemental analysis. The polymer product thus contained 21.6 parts of the monomer prepared in Example II grafted to it.

XVI. Grafting of 2-[3-(butylthio)-2-methylpropionyloxy]ethyl N-[α,α-dimethyl-3-isopropenylbenzyl]carbamate Into a bottle was weighed 19.4 grams of the product prepared in example III, 21 grams of (3-isopropenyl)-α,α-dimethylbenzylisocyanate, 41 grams of toluene, 0.1 g. dibutyltindilaurate and 3 drops of triethylamine. The reaction bottle was rotated at 25° C. on a bottle roller. The reaction was followed by thin layer chromatography. The solvent was distilled off when the reaction was complete. The yield was 40 grams.

Forty grams of an SBR1006 type latex (25% solids) was charged to the reaction bottle. A solution composed of 3 grams of the product prepared above emulsified in 5 grams of a saturated potassium oleate solution was added to the bottle. The bottle was purged with nitrogen and then injected with 3.3 mls. of a 3% AIBN in Toluene/THF (0.1 g. AIBN) solution. The bottle was rotated in a 70° C. water bath for 16 hours and then coagulated in isopropyl alcohol. The sample was extracted with methanol. The extracted polymer contained 0.3% of sulfur due to the successful grafting of the monomer. The polymer product thus contained 2.23 parts of the grafted synergist.

The preferred method for incorporating the compounds of the instant invention involves the polymerization method which entails the use of the synergist as a monomer in a free radical polymerization reaction.

To afford adequate protection against degradation the polymers should contain from about 0.10 part to about 10.0 parts by weight of the segmeric form of the synergist per 100 parts by weight of the polymer, although from about 0.50 part to about 5.0 parts is normally satisfactory, from about 0.50 part to about 3.0 parts being preferred. As much as 20 parts, 30 parts, 50 parts and more of the polymer may consist of the synergist segmeric unit while the lower limit may be 0.50 part to 0.10 part and lower. However, as the amount of bound synergist increases the physical characteristics of the polymer are altered accordingly.

Where it is desired that the polymer act as a polymeric age resistor which may be blended with unstabilized polymers the polymer should normally contain greater amounts of the monomeric stabilization system. The remainder of the polymer is comprised preferably of the segmeric form of at least one conjugated diene monomer and/or the segmeric form of at least one vinyl monomer. Preferably the polymers contain at least 50 percent by weight of the segmeric form of a diene, preferably a conjugated diene such as butadiene or isoprene.

XVII. Polymerization of Synergistic Monomers

To test some of the compounds as polymerizable synergists, a butadiene/styrene/synergist terpolymer was prepared using the following recipe:

| Ingredients | Parts |
|---|---|
| Butadiene | 68.50 |
| Styrene | 21.50 |
| Monomer from Example IV | 10.00 |
| Tertiary Dodecyl Mercaptan | .50 |
| Potassium salt of Resinate (80%) | 2.76 |
| KOH | .38 |
| Tallow Fatty Acid | 1.95 |
| Sodium salt of condensed naphthalene sulfonic acid | .08 |
| Water | 200.00 |
| $H_2SO_4$ | .01 |
| $FeSO_4 \cdot 7H_2O$ | .015 |
| Chelating Agent* | .063 |
| Sodium Formaldehyde Sulfoxylate | .056 |
| Sodium Dimethyldithiocarbamate (35%) | .558 |
| Diethylhydroxyamine | .185 |

*90/10 mixture of tetrasodium salt of ethylenediaminetetraacetic acid and monosodium salt of N,N—di(α-hydroxyethyl)glycine The resulting polymer was coagulated, extracted 48 hours with methanol in a Soxhlet extractor, dried and analyzed to determine the amount of bound synergist. The polymer was dissolved in toluene, and unstabilized SBR 1006 cement was blended with the terpolymer cement to yield final synergist contents of 0.25, 0.50 and 0.75 parts by weight. These samples were then stabilized with an antioxidant. Films were cast from toluene cements and oxygen absorption measurements were made on the films.

XVIII. Testing of Compounds

The activity of the compounds and mixtures of this invention was determined by means of the oxygen absorption test. The testing procedure is of the type described in detail in *Ind. & Engr. Chem.*, Vol. 43, p. 456 (1951) and *Ind. & Engr. Chem.*, Vol. 45, p. 392 (1953).

From the data in Table I it is quite evident that the compounds of this invention synergistically enhance the antioxidative activity of commercial amine antioxidants. In addition, the commercially accepted synergistic DLTDP failed to perform as well as the compounds of this invention.

TABLE I

| | | Hours to Absorb | |
|---|---|---|---|
| Compound - All Parts By Weight | | 1.0% $O_2$ By Weight | 1.5% $O_2$ By Weight |
| (1) | 1.0 pt WS-29* (control)+ | 724 | 1226 |
| (2) | 0.5 pt WS-29 (control)+ | 692 | 1018 |
| (3) | 0.75 pt WS-29 and 0.25 pt bound synergist from Ex IV | 854 | 1271 |
| (4) | 0.5 pt WS-29 and 0.5 pt bound synergist from Ex IV | 969 | 1350 |
| (5) | 0.25 pt WS-29 and 0.75 pt bound synergist from Ex IV | 912 | 1438 |
| (6) | 1.0 pt WS-300** (control)+ | 444 | 758 |
| (7) | 0.75 pt WS-300 and 0.25 pt bound synergist from Ex IV | 462 | 795 |
| (8) | 0.5 pt WS-300 and 0.5 pt bound synergist from Ex IV | 533 | 842 |
| (9) | 0.25 pt WS-300 and 0.75 pt bound synergist from Ex IV | 600 | 937 |
| (10) | 0.5 pt WS-29 and 0.5 pt DLTDP*** | 758 | 1169 |

*WS-29 is a styrenated diphenylamine stabilizer marketed by The Goodyear Tire & Rubber Company under the tradename Wingstay 29.
**WS-300 is N—phenyl-N'—(1,3-dimethylbutyl)-p-phenylenediamine marketed by The Goodyear Tire & Rubber Company under the tradename Wingstay 300.
***DLTDP is dilauryl 3,3'-thiodipropionate - the most widely used commercial synergist.
+Control polymers contained no bound synergist.

XIX.

The compounds prepared in Examples II and IV were individually polymerized in an SBR recipe similar to that described in Example XVII. The resulting extracted polymers contained 3.75 parts of bound synergist from Example II and 3.0 parts of bound product from Example IV, respectively. The synergist containing polymers were each dissolved in toluene and then diluted with an SBR 1006 toluene cement to reach the desired level of bound synergist in each test sample. Wingstay ™ C, a phenolic stabilizer, was used as the antioxidant/costabilizer in the testing. Polymer cements containing various ratios of these stabilizers were cast on aluminum sheets and evaluated at 100° C. by oxygen absorption testing until 1.0% oxygen had been absorbed by each test sample.

The data from the testing of the bound synergist and two non-bound synergists is presented in Table II. The data indicates that the synergists of this invention, whether bound of non-bound, exhibit synergism with a commercially accepted phenolic antioxidant.

TABLE II

| | Oxygen Absorption Data | |
|---|---|---|
| Compound - Parts By Weight per 100 Parts Rubber | | Hours to Absorb 1.0% $O_2$ By Weight |
| (1) | 2.0 pt SBR bound monomer from Example II + 0.5 pt Wingstay C | 755 |
| (2) | 1.5 pt SBR bound monomer from Example II + 0.5 pt Wingstay C | 634 |
| (3) | 1.0 pt SBR bound monomer from Example II + 0.0 pt Wingstay C | 69 |
| (4) | 0.75 pt SBR bound monomer from Example II + 0.25 pt Wingstay C | 368 |
| (5) | 0.50 pt SBR bound monomer from Example II + 0.50 pt Wingstay C | 476 |
| (6) | 0.25 pt SBR bound monomer from Example II + 0.75 pt Wingstay C | 416 |
| (7) | 0.0 pt SBR bound monomer from Example II + 1.0 pt Wingstay C | 168 |
| (8) | 2.0 pt SBR bound monomer from Example IV + 0.5 pt Wingstay C | 566 |
| (9) | 1.5 pt SBR bound monomer from Example IV + 0.5 pt Wingstay C | 589 |

TABLE II-continued

Oxygen Absorption Data

| Compound - Parts By Weight per 100 Parts Rubber | Hours to Absorb 1.0% $O_2$ By Weight |
|---|---|
| (10) 1.0 pt SBR bound monomer from Example IV + 0.0 pt Wingstay C | 67 |
| (11) 0.75 pt SBR bound monomer from Example IV + 0.25 pt Wingstay C | 275 |
| (12) 0.50 pt SBR bound monomer from Example IV + 0.50 pt Wingstay C | 494 |
| (13) 0.25 pt SBR bound monomer from Example IV + 0.50 pt Wingstay C | 454 |
| (14) *0.5 pt non-bound monomer from Example II + 0.5 pt Wingstay C | 457 |
| (15) *0.5 pt non-bound monomer from Example IV + 0.5 pt Wingstay C | 590 |

*Samples were not extracted.

XX.

Polymer solutions were prepared the same as described in Example XIX except an SBR polymer cement containing a bound antioxidant, 2,6 ditertiarybutyl-4-hydroxyphenyl methacrylate was used instead of Wingstay C as the costabilizer. The recipe for copolymerizing the phenolic antioxidant monomer was similar to that described in Example XVII. (See U.S. Pat. No. 3,953,402.) Polymer cements containing 1½ grams of stabilized polymer were cast on 12 cm by 17 cm aluminum sheets and dried. The dried samples were soxhlet solvent extracted with hot methanol for 0, 8, 16 and 24 hours. The dried samples were then evaluated by oxygen absorption testing at 100° C. until they had absorbed 1.0% $O_2$ by weight. The data in Table III demonstrates that:

(1) The synergist and phenolic antioxidant act synergistically to prolong the life of the polymer.

(2) If either the phenolic antioxidant and/or the synergist are not chemically attached to the polymer chain, they are rapidly extracted and lost.

(3) If the antioxidant and the synergist are chemically attached to the polymer, they cannot be lost due to solvent extraction and volatility.

(4) The commercial and closest prior art synergist dilauryl thiodipropionate (DLTDP) is very easily extracted (Samples 17 and 18 from Table III) because it cannot be chemically attached to the polymer.

XXI.

The monomer prepared in Example VI was copolymerized in an SBR recipe similar to that described in Example XVII. The polymer was extracted and analyzed to determine the amount of bound compound VI. In a similar recipe, 2,6 di-tertiary-butyl-4-hydroxyphenyl methactylate was copolymerized in an SBR recipe. The polymer was extracted and then analyzed to determine the amount of each monomer incorporated into the SBR chains. Each polymer was dissolved in toluene and adjusted to the desired stabilizer concentration with a toluene cement of SBR 1006.

The monomers were also evaluated in their non-bound forms. The data in Tables IV, V and VI show that the monomer from Example VI is an active synergist when used as an additive, like dilaurylthiodipropionate (DLTDP), (in a non-bound form). However, the monomer prepared in Example VI is totally non-effective once it is chemically attached to a polymer. Hence, we see that all alkylthioesters are not active as polymer bound synergists.

TABLE IV

| Hours to Absorb 1.0% $O_2$ at 100° C. | | |
|---|---|---|
| Parts of Bound Synergist Compound A | | Hours to Absorb 1% $O_2$ |
| | Parts of Non-Bound Antioxidant Compound B | |
| 1.54 | 0 | 30 |

TABLE III

Oxygen Absorption Data of SBR 1006

| | Stabilizer System Used | Hours Extracted With Methanol | | | | Hours to Absorb 1.0% $O_2$ by weight at 100° C. |
|---|---|---|---|---|---|---|
| | | 0 | 8 | 16 | 24 | |
| (1) | 1.0 pt bound Compound A | X | | | | no data *(360) |
| (2) | 1.0 pt bound Compound A | | X | | | 358 |
| (3) | 1.0 pt bound Compound A | | | X | | 348 |
| (4) | 1.0 pt bound Compound A | | | | X | 356 |
| (5) | 1.0 pt non-bound Compound A | X | | | | 350 |
| (6) | 1.0 pt non-bound Compound A | | X | | | 2 |
| (7) | 1.0 pt non-bound Compound A | | | X | | 1 |
| (8) | 1.0 pt non-bound Compound A | | | | X | 1 |
| (9) | .5 pt bound Compound A + .5 pt bound Compound B | X | | | | no data *(560) |
| (10) | .5 pt bound Compound A + .5 pt bound Compound B | | X | | | 561 |
| (11) | .5 pt bound Compound A + .5 pt bound Compound B | | | X | | 642 |
| (12) | .5 pt bound Compound A + .5 pt bound Compound B | | | | X | 692 |
| (13) | .5 pt non-bound Compound A + .5 pt non-bound Compound B | X | | | | no data *(560) |
| (14) | .5 pt non-bound Compound A + .5 pt non-bound Compound B | | X | | | 2 |
| (15) | .5 pt non-bound Compound A + .5 pt non-bound Compound B | | | X | | 3 |
| (16) | .5 pt non-bound Compound A + .5 pt non-bound Compound B | | | | X | 2 |
| (17) | .5 pt bound Compound A + .5 pt DLTDP | X | | | | 670 |
| (18) | .5 pt bound Compound A + .5 pt DLTDP | | | | X | 250 |
| No Stabilizer Used | | | | | | 30 |

Compound A = 2,6-ditertiarybutyl-4-hydroxyphenyl methacrylate
Compound B = Synergist prepared in Example II
*No data due to $O_2$ absorption apparatus failure - expected value in ( )'s.

TABLE IV-continued

Hours to Absorb 1.0% $O_2$ at 100° C.

| Parts of Bound Synergist Compound A | | Hours to Absorb 1% $O_2$ |
|---|---|---|
| 1.23 | .2 | 112 |
| .93 | .4 | 256 |
| .62 | .6 | 171 |
| .31 | .8 | 305 |
| 0 | 1.0 | 332 |
| Parts of Non Bound Wingstay C | | |
| 1.23 | .2 | 126 |
| .93 | .4 | 153 |
| .62 | .6 | 223 |
| .31 | .8 | 265 |
| | 1.0 | 241 |

Compound A - Monomer prepared in Example VI
Compound B - 2,6 ditertiary-4-hydroxyphenyl methacrylate
No synergism is shown as long as the monomer prepared in Example VI is chemically bound to the polymer.

TABLE V

Hours to Absorb 1.0% Oxygen at 100° C. In A System Containing Wingstay C and Non Polymer Bound Compound A

| Parts of Wingstay C | Parts of Non Bound Compound A | Hours to Absorb 1.0% $O_2$ |
|---|---|---|
| 1.0 | 0 | 241 |
| .8 | .2 | 504 |
| .6 | .4 | 588 |
| .4 | .6 | 542 |
| .2 | .8 | 361 |
| 0 | 1.0 | 93 |

The sulfenic acid which results when Compound A (synergist prepared in Example VI) is used in a non-bound form is active as an antioxidant synergist.

TABLE VI

Oxygen Absorption Data of a System Containing Non-Bound Antioxidant and Synergist

| Parts of Non Bound Compound B | Parts of Non Bound Compound A | Hours to Absorb 1.0% $O_2$ |
|---|---|---|
| 0 | 1.0 | 73 |
| .25 | .75 | 416 |
| .50 | .50 | 542 |
| .75 | .25 | 502 |
| 1.00 | 0 | 336 |

Compound A = Synergist prepared in Example VI
Compound B = 2,6 ditertiarybutyl-4-hydroxyphenyl methacrylate
Wingstay C = A phenolic stabilizer made by The Goodyear Tire & Rubber Company

XXII. Polymerization of Synergist in an NBR Recipe

In the manner of Example XVII, an acrylonitrile-butadiene-synergist (of Example IV) terpolymer is prepared. The ingredients and the proportions are listed below.

| Ingredients | Parts |
|---|---|
| Acrylonitrile | 29.0 |
| Butadiene | 61.0 |
| Synergist from Example IV | 10.0 |
| Tertiary dodecyl mercaptan | 0.5 |
| Potassium soap of disproportioned rosin acids | 1.5 |
| Sodium salt of tallow fatty acids | 1.4 |
| Sodium salt of condensed naphthalene sulfonic acid | 0.12 |
| $Na_2SO_4$ | 1.5 |
| Water | 100.0 |
| Chelating Agent | 0.027 |
| $FeSO_4 \cdot 7H_2O$ | 0.006 |
| Sodium formaldehyde sulfoxylate | 0.074 |
| $Na_2S_2O_4$ | 0.006 |
| Paramenthane hydroperoxide | 0.08 |

The soaps are placed in 95 parts of the water along with the sodium salt of the sulfonic acid and the $Na_2SO_4$ and charged to the reactor. The mercaptan dissolved in 13.3 parts of the acrylonitrile, is then charged. This is followed by the addition of the synergist in 13.3 parts of acrylonitrile. The butadiene is then added. The chelating agent, iron compound, sulfoxylate and $Na_2S_2O_4$ is then added in 5 parts of water. Finally the hydroperoxide is added in 1.4 parts of the acrylonitrile. Initial polymerization temperature is 21° C. The temperature is increased to 38° C. as conversion progressed. The hydroperoxide is charged as 0.04 parts initially and as two 0.02 part increments during the course of the polymerization. When conversion reaches the desired level a shortstop is added.

XXIII.

A series of polymers were prepared using a monomer ratio of 65 parts of butadiene, 25 parts of styrene and 10 parts of total stabilizer (synergist plus antioxidant). A recipe similar to the ones previously described was used. The polymerizable antioxidant monomer N-(4-anilinophenyl)methacrylamide was used as the co-stabilizer in this study. Table VII shows the exact monomer charge for each antioxidant polymer prepared. The polymers were coagulated and then soxhlet extracted with hot methanol for 48 hours. Elemental sulfur and nitrogen content analysis were used to determine the amount of stabilizer monomer incorporated in the SBR after extraction. This data is shown in Table VIII.

TABLE VII

Parts of Monomers Charged in the Polymerization

| | Sample | | | | | | |
|---|---|---|---|---|---|---|---|
| | A | B | C | D | E | F | G |
| Styrene | 25 | | | | | | |
| Butadiene | 65 | | | | | | |
| Synergist From Ex III | 10 | | | | | 5 | |
| Synergist From Ex IV | | 10 | | | | | |
| Synergist From Ex XII | | | 10 | | | | |
| Synergist from Ex VIII | | | | 10 | | | 5 |
| Synergist from Ex VI | | | | | 10 | | |
| N—(4-anilinophenyl) methacrylamide | | | | | | 5 | 5 |

TABLE VIII

Analyzed Parts of Bound Stabilizer Monomers From the Polymers Prepared in Table VII

| Stabilizer Monomer Used | A | B | C | D | E | F | G |
|---|---|---|---|---|---|---|---|
| Synergist From Ex II | 1.75 | | | | | 2.1 | |
| Synergist From Ex IV | | 7.51 | | | | | |
| Synergist From Ex XII | | | 8.19 | | | | |
| Synergist From Ex VIII | | | | 8.22 | | | 6.0 |
| Synergist From Ex VI | | | | | 9.12 | | |
| N—(4-anilinophenyl) methacrylamide | | | | | | 4.4 | 3.4 |

The polymers described in Tables VII and VIII were evaluated by Oxygen Absorption testing. The antioxidant and synergist containing polymers were dissolved in toluene and then diluted with an SBR 1006 toluene cement to obtain the desired polymer bound stabilizer concentrations are listed in Table IX.

TABLE IX

Oxygen Absorption Data for Polymers Prepared in Tables VII and VIII

| Stabilization System | Hours to Absorb 1.0% $O_2$ |
| --- | --- |
| .64 pt Bound Synergist VIII + .36 pt Bound Antioxidant* | 694 |
| .32 pt Bound Synergist II + .68 pt Bound Antioxidant* | 819 |
| .36 pt Bound Antioxidant* | 189 |
| .50 pt Bound Antioxidant* | 251 |
| .68 pt Bound Antioxidant* | 329 |
| 1.0 pt Bound Antioxidant* | 448 |
| .64 pt Bound Synergist VIII | 26 |
| .32 pt Bound Synergist II | 30 |

*N—(4-anilinophenyl)methacrylamide

XXIV.

The polymer prepared as described in Example XXIII, Tables VII and VIII, Sample B, was used in an oxygen absorption study with Wingstay ™ 300 and Agerite ™ Resin D (polymerized 2,2,4-trimethyl-1,2-dihydroquinoline) to demonstrate synergism. The polymer bound synergist (monomer from Example IV) and the amine costabilizer were diluted with SBR 1006 to reach the desired stabilizer levels. Dilaurylthiodipropionate (DLTDP) was used as a non polymer bound synergist control.

| | Hours to Absorb | |
| --- | --- | --- |
| | 1.0% | 2.0% |
| 0.1 pt Wingstay ™ 300 + .5 pt SBR Bound Example IV Monomer | 742 | 941 |
| 0.1 pt Wingstay ™ 300 + 1.0 pt SBR Bound Example IV Monomer | 903 | 1,166 |
| 0.5 pt SBR Bound Example IV Monomer | 35 | 63 |
| 1.0 pt SBR Bound Example IV Monomer | 175 | 226 |
| 0.1 pt Wingstay ™ 300 + .5 pt DLTDP | 766 | 1,025 |
| 0.1 pt Wingstay ™ 300 + 1.0 pt DLTDP | 960 | N/A |
| 0.1 pt Wingstay ™ 300 | 461 | N/A |
| 0.1 pt Agerite ™ Resin D + .5 pt SBR Bound Example IV Monomer | 903 | 1,055 |
| 0.1 pt Agerite ™ Resin D | 62 | 109 |
| No antioxidant or synergist | 4 | |

The data clearly shows that the SBR bound synergistic monomer from Example IV acts synergistically with Wingstay ™ 300 and also Agerite ™ Resin D. The bound synergists are just as effective as the non bound DLTDP. However, the polymer bound synergist of this invention cannot be lost by migration, volatility or extraction. DLTDP is easily extracted from polymers.

INDUSTRIAL APPLICABILITY

From the testing data obtained it is evident that the compounds disclosed herein significantly enhance the stability of polymers when combined with known antioxidants. The industrial applications are readily apparent in light of the high synergistic activity of these novel compounds when used in conjunction with known antioxidants. Use of the compounds of this invention would significantly reduce the amount of costly antioxidant that is needed to provide the desired stability of the organic material.

While certain representative embodiments and details have been shown for the purpose of illustrating the invention, it will be apparent to those skilled in this art that various changes and modifications may be made herein without departing from the scope of this invention.

I claim:

1. A composition comprising: (1) an oxidizable diene containing polymer; (2) a phenolic or amine antidegradant in physical admixture with the oxidizable organic material; and (3) a synergist in physical admixture with the oxidizable organic material, the improvement comprising at least one synergist selected from the group of compounds having the structural formulae I-XII:

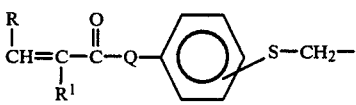

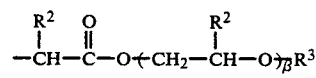

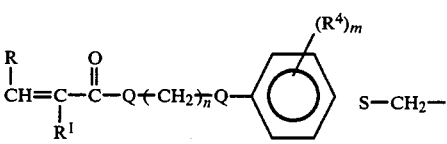

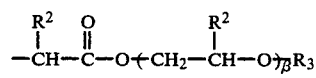

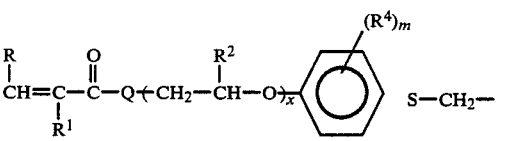

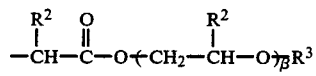

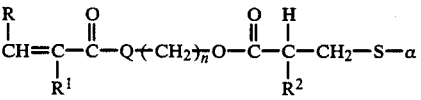

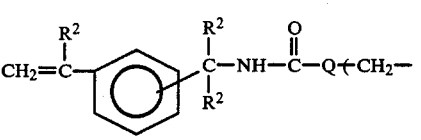

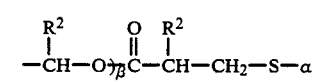

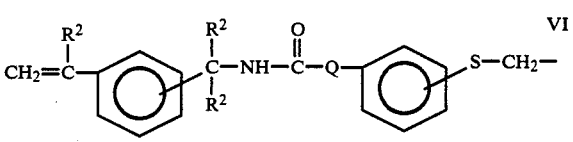

-continued

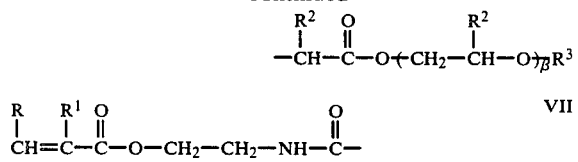
VII

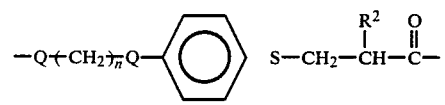

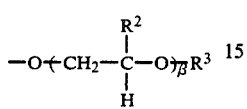

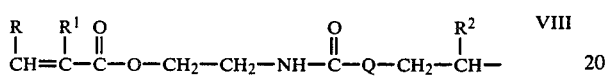
VIII

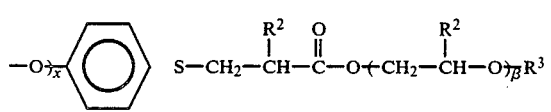

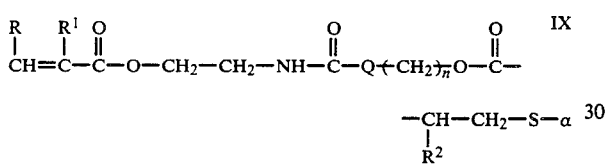
IX

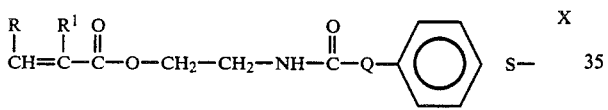
X

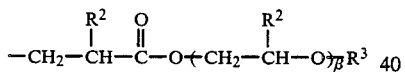

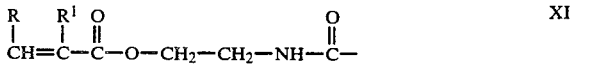
XI

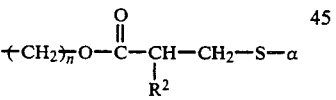

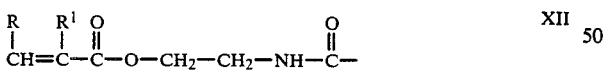
XII

-continued

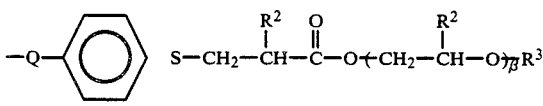

wherein

R is selected from hydrogen, methyl or phenyl radicals;

$R^1$ is selected from hydrogen, methyl or ethyl radicals;

$R^2$ is selected from hydrogen or methyl radicals;

$R^3$ is selected from hydrogen, alkyl radicals of 1 to 12 carbon atoms, phenyl and substituted phenyl radicals;

$R^4$ is an alkyl radical of 1 to 3 carbon atoms;

Q may be the same or different divalent radical selected from —O— or —NH—;

β is 0 or a whole number from 1 to 20;

n is a whole number from 2 to 20;

m is 0 or 1 or 2;

x is a whole number from 1 to 20;

α is a monovalent radical selected from alkyl radicals of 1 to 30 carbon atoms, the radical

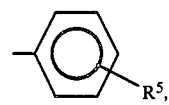

or the radical

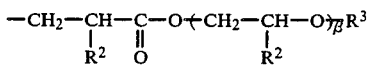

wherein $R^2$, $R^3$ and β are defined as above and $R^5$ is selected from hydrogen, hydroxyl and alkyl radicals of 1 to 10 carbon atoms.

2. A composition comprising: (1) an oxidizable diene containing polymer; (2) a phenolic or amine antidegradant in physical admixture with the oxidizable organic material; and (3) a polymeric composition in physical admixture with the oxidizable organic material, the improvement comprising a polymeric composition obtained from polymerizing in a free radical polymerization system, a monomer system that contains at least one synergistic monomer selected from the structural formulae I-XII:

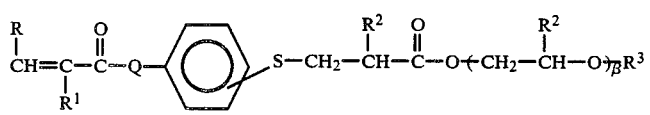
I

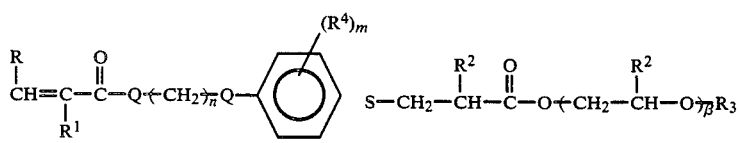
II

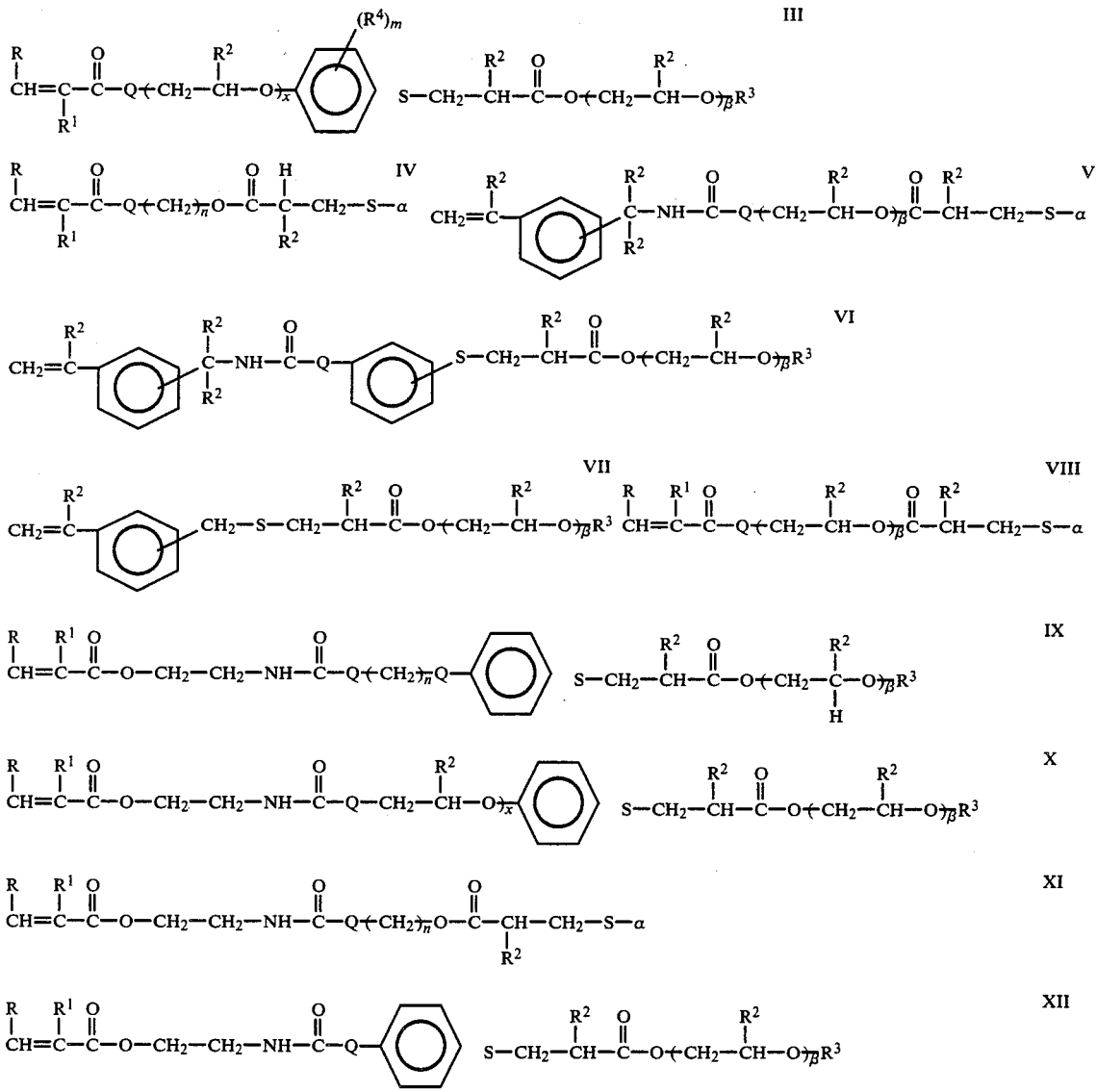

wherein
- R is selected from hydrogen, methyl or phenyl radicals;
- $R^1$ is selected from hydrogen, methyl or ethyl radicals;
- $R^2$ is selected from hydrogen or methyl radicals;
- $R^3$ is selected from hydrogen, alkyl radicals of 1 to 12 carbon atoms, phenyl and substituted phenyl radicals;
- $R^4$ is an alkyl radical of 1 to 3 carbon atoms;
- Q may be the same or different divalent radical selected from —O— or —NH—;
- $\beta$ is 0 or a whole number from 1 to 20;
- n is a whole number from 2 to 20;
- m is 0 or 1 or 2;
- x is a whole number from 1 to 20;
- $\alpha$ is a monovalent radical selected from alkyl radicals of 1 to 30 carbon atoms, the radical

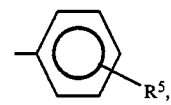

or the radical

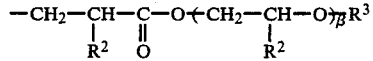

wherein $R^2$, $R^3$ and $\beta$ are defined as above and $R^5$ is selected from hydrogen, hydroxyl and alkyl radicals of 1 to 10 carbon atoms.

3. A composition comprising: (1) an oxidizable diene containing polymer; and
(2) a polymeric composition, the improvement comprising a polymeric composition that comprises (a) segmeric units of a free radical, polymerizable amine or phenolic antidegradant and (b) segmeric units derived from at least one free radical polymerizable compound having the structural formulae I–XII:

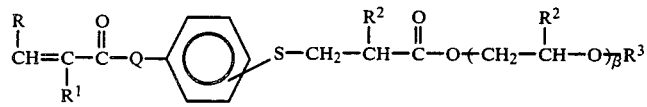

I

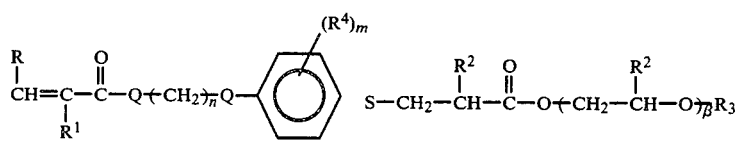

II

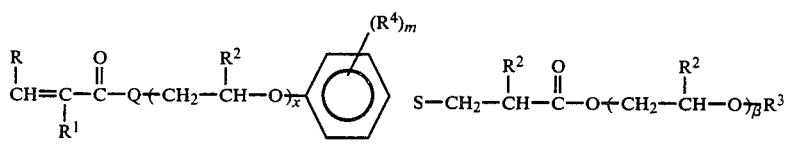

III

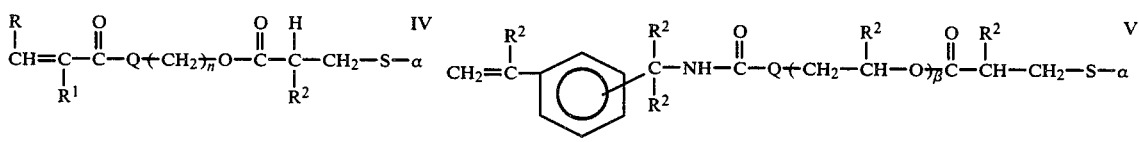

IV, V

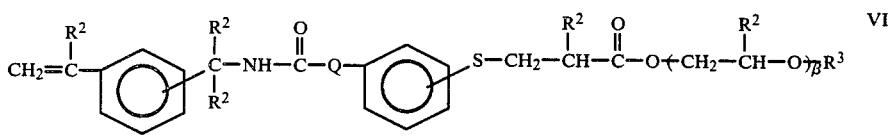

VI

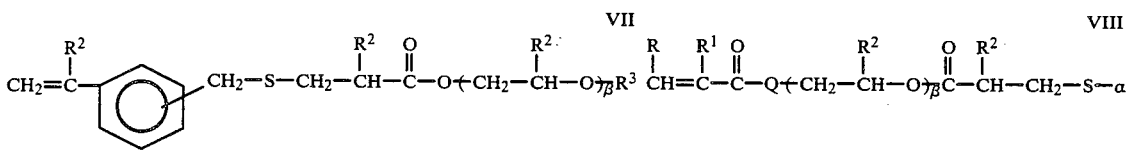

VII, VIII

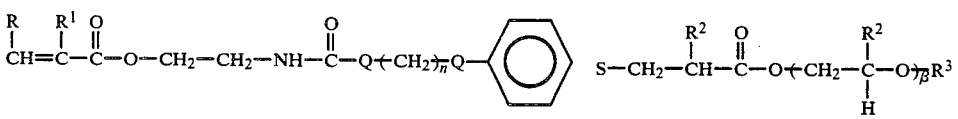

IX

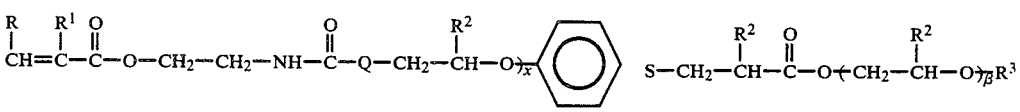

X

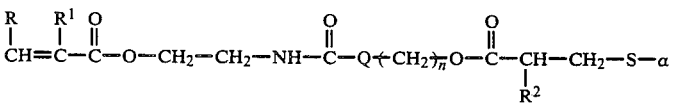

XI

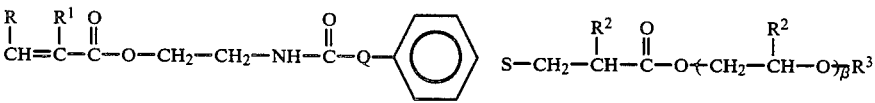

XII wherein
R is selected from hydrogen, methyl or phenyl radicals;
R¹ is selected from hydrogen, methyl or ethyl radicals;
R² is selected from hydrogen or methyl radicals;
R³ is selected from hydrogen, alkyl radicals of 1 to 12 carbon atoms, phenyl and substituted phenyl radicals;
R⁴ is an alkyl radical of 1 to 3 carbon atoms;

Q may be the same or different divalent radical selected from —O— or —NH—;

β is 0 or a whole number from 1 to 20;
n is a whole number from 2 to 20;
m is 0 or 1 or 2;
x is a whole number from 1 to 20;
α is a monovalent radical selected from alkyl radicals of 1 to 30 carbon atoms, the radical

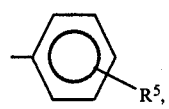

or the radical

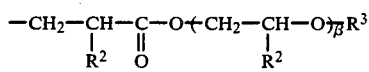

wherein $R^2$, $R^3$ and $\beta$ are defined as above and $R^5$ is selected from hydrogen, hydroxyl and alkyl radicals of 1 to 10 carbon atoms.

4. A polymeric composition of matter that comprises (a) segmeric units derived from unsaturated, free radical polymerizable amine and phenolic antidegradants, and (b) segmeric units derived from at least one unsaturated free radical polymerizable compound having structural formulae I–XII:

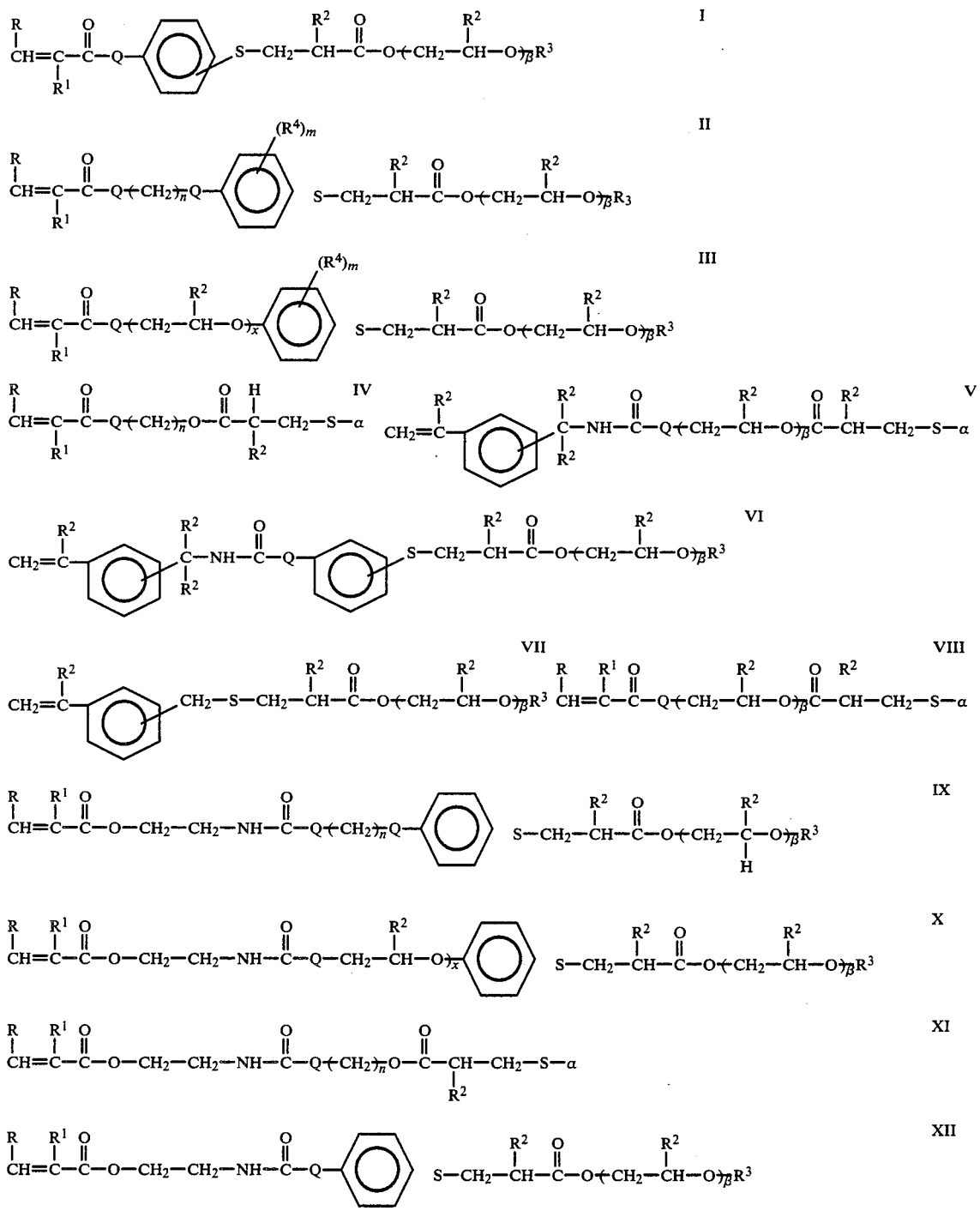

wherein
R is selected from hydrogen, methyl or phenyl radicals;
$R^1$ is selected from hydrogen, methyl or ethyl radicals;
$R^2$ is selected from hydrogen or methyl radicals;
$R^3$ is selected from hydrogen, alkyl radicals of 1 to 12 carbon atoms, phenyl and substituted phenyl radicals;
$R^4$ is an alkyl radical of 1 to 3 carbon atoms;
Q may be the same or different divalent radical selected from —O— or —NH—;
β is 0 or a whole number from 1 to 20;
n is a whole number from 2 to 20;
m is 0 or 1 or 2;
x is a whole number from 1 to 20;
α is a monovalent radical selected from alkyl radicals of 1 to 30 carbon atoms, the radical

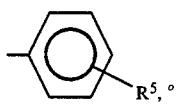

or the radical

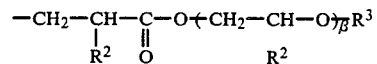

wherein $R^2$, $R^3$ and β are defined as above and $R^5$ is selected from hydrogen, hydroxyl and alkyl radicals of 1 to 10 carbon atoms.

5. A polymeric composition according to claim 4 wherein the free radical polymerization is an emulsion polymerization, and the polymeric composition comprises 10-90 parts by weight of segmers derived from the group comprising acrylonitrile, styrene, α-methylstyrene, 10-90 parts by weight of segmers derived from the group comprising 1,3-butadiene and isoprene, and 0.1 ∝ 50 parts by weight of at least one segmer derived from structural formulae I-XII.

6. A polymeric composition of matter derived from the reaction of an a diene containing polymer, in the presence of a free radical initiator selected from the group consisting of azo systems, azonitrile systems, and redox systems, with a compound selected from the group consisting of structural formulae I-XII:

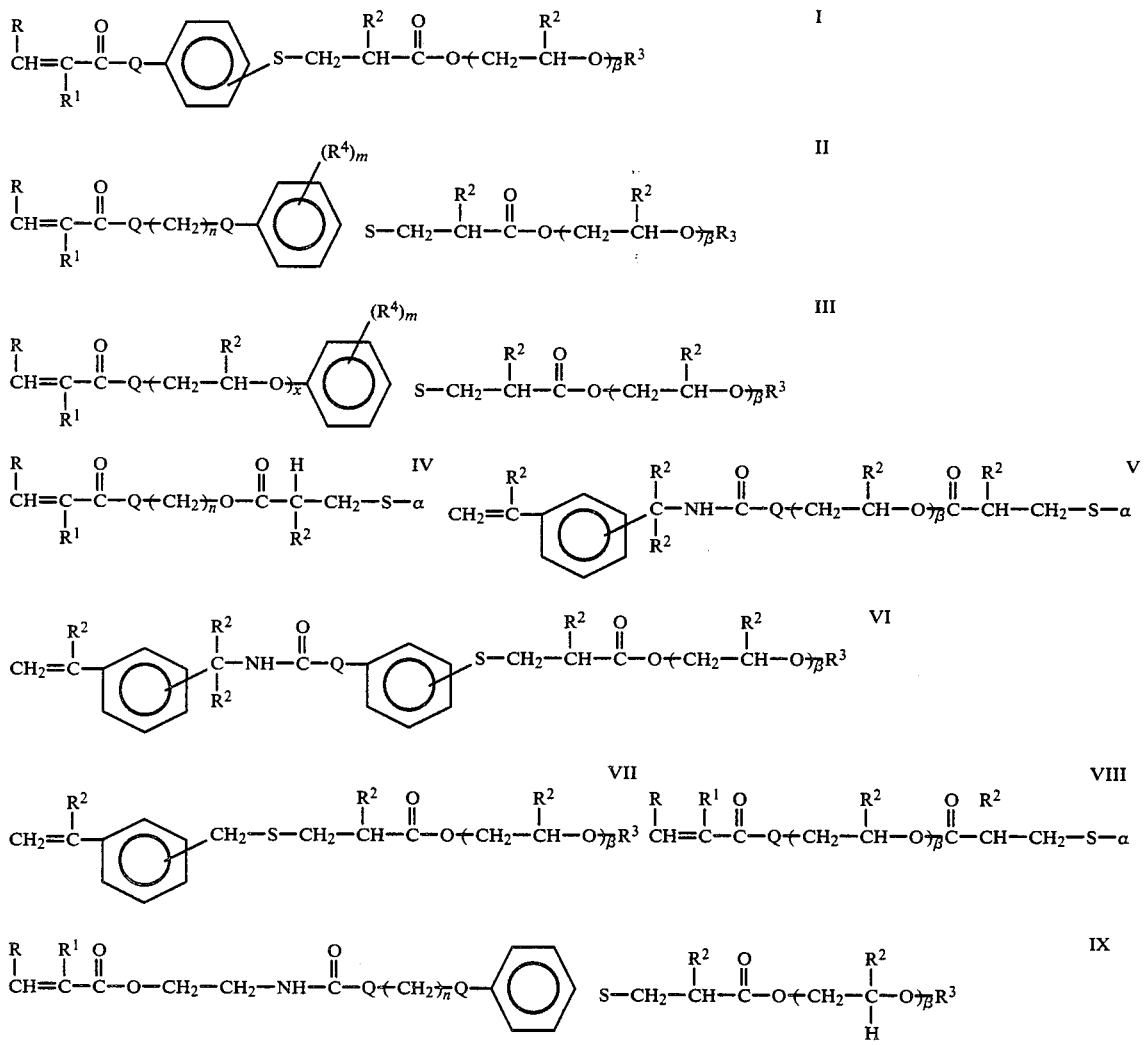

-continued

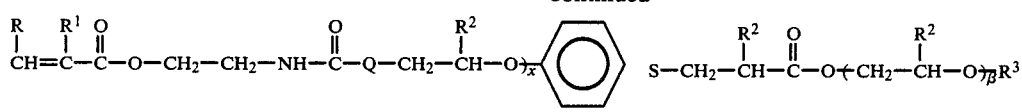 X

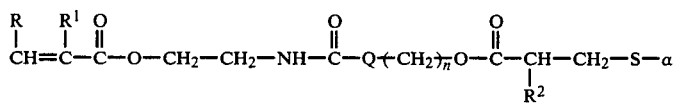 XI

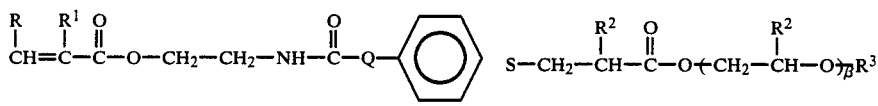 XII wherein
- R is selected from hydrogen, methyl or phenyl radicals;
- $R^1$ is selected from hydrogen, methyl or ethyl radicals;
- $R^2$ is selected from hydrogen or methyl radicals;
- $R^3$ is selected from hydrogen, alkyl radicals of 1 to 12 carbon atoms, phenyl and substituted phenyl radicals;
- $R^4$ is an alkyl radical of 1 to 3 carbon atoms;
- Q may be the same or different divalent radical selected from —O— or —NH—;
- $\beta$ is 0 or a whole number from 1 to 20;
- n is a whole number from 2 to 20;
- m is 0 or 1 or 2;
- x is a whole number from 1 to 20;
- $\alpha$ is a monovalent radical selected from alkyl radicals of 1 to 30 carbon atoms, the radical

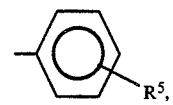

or the radical

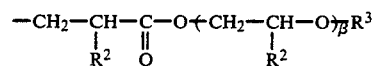

wherein $R^2$, $R^3$ and $\beta$ are defined as above and $R^5$ is selected from hydrogen, hydroxyl and alkyl radicals of 1 to 10 carbon atoms.

7. A polymeric composition of matter derived from polymerizing in a free radical polymerization system a monomer system that comprises: (1) at least one diene monomer; and (2) at least one monomer selected from structural formulae I-XII:

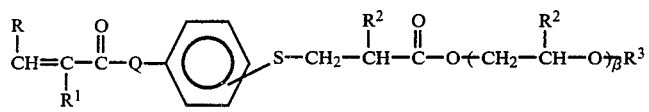 I

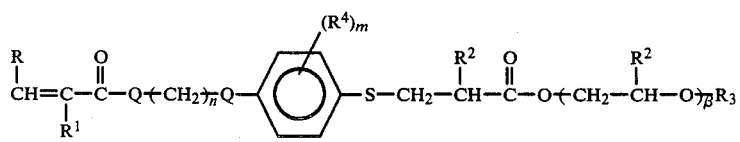 II

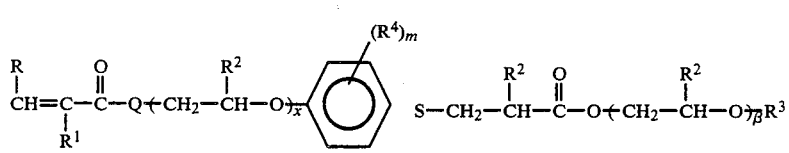 III

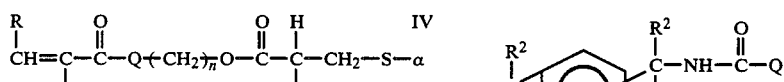 IV

 V

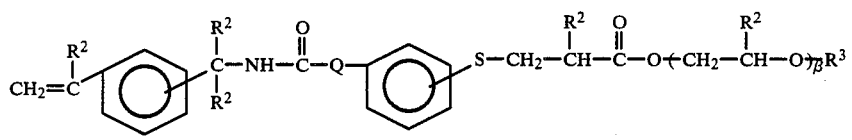 VI

-continued

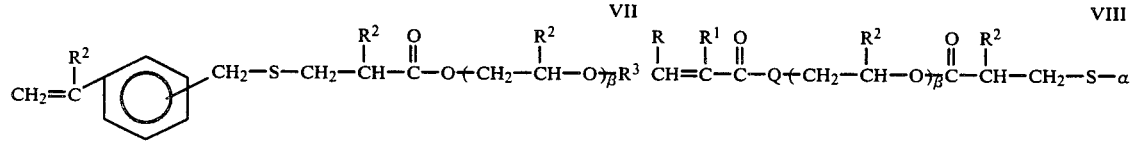

VII

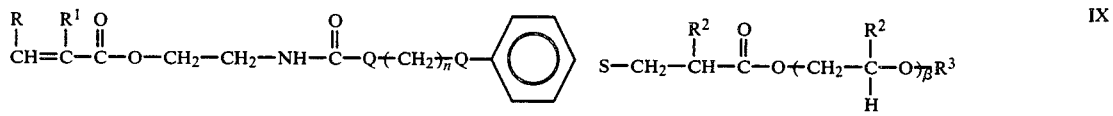

VIII

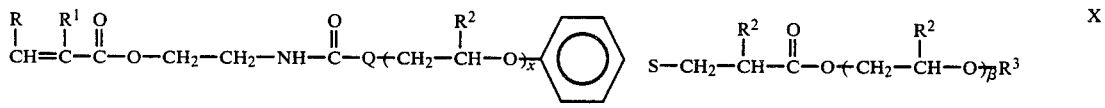

IX

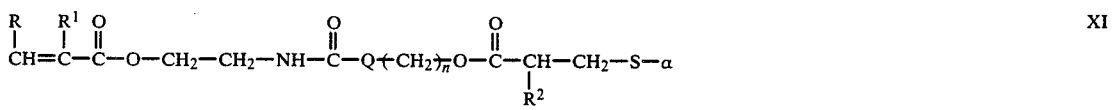

X

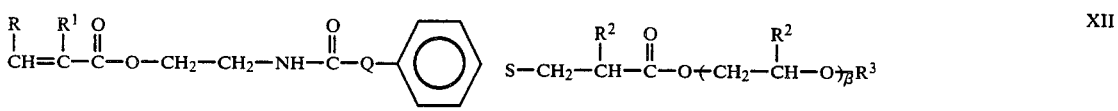

XI

XII wherein

R is selected from hydrogen, methyl or phenyl radicals;

R¹ is selected from hydrogen, methyl or ethyl radicals;

R² is selected from hydrogen or methyl radicals;

R³ is selected from hydrogen, alkyl radicals of 1 to 12 carbon atoms, phenyl and substituted phenyl radicals;

R⁴ is an alkyl radical of 1 to 3 carbon atoms;

Q may be the same or different divalent radical selected from —O— or —NH—;

β is 0 or a whole number from 1 to 20;

n is a whole number from 2 to 20;

m is 0 or 1 or 2;

x is a whole number from 1 to 20;

α is a monovalent radical selected from alkyl radicals of 1 to 30 carbon atoms, the radical

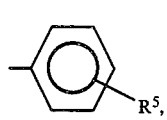

or the radical

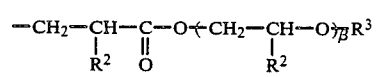

wherein R², R³ and β are defined as above and R⁵ is selected from hydrogen, hydroxyl and alkyl radicals of 1 to 10 carbon atoms.

8. A composition of matter represented by structural formulae I-X:

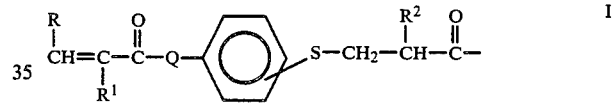
I

II

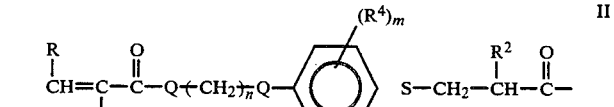
III

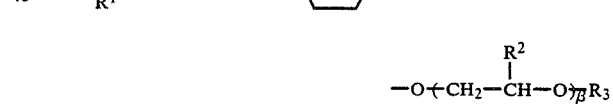
IV

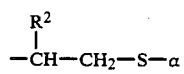

-continued $$CH_2=C(R^2)-C_6H_4-C(R^2)(R^2)-NH-C(=O)- \quad V$$

$$-Q-C_6H_4-S-CH_2-CH(R^2)-C(=O)-O-(CH_2-CH(R^2)-O)_\beta-R^3$$

$$CH_2=C(R^2)-C_6H_4-CH_2-S-CH_2-CH(R^2)-C(=O)- \quad VI$$

$$-O-(CH_2-CH(R^2)-O)_\beta-R^3$$

$$CH(R)=C(R^1)-C(=O)-O-CH_2-CH_2-NH-C(=O)- \quad VII$$

$$-Q-(CH_2)_n-Q-C_6H_4-S-CH_2-CH(R^2)-C(=O)-$$

$$-O-(CH_2-C(R^2)(H)-O)_\beta-R^3$$

$$CH(R)=C(R^1)-C(=O)-O-CH_2-CH_2-NH-C(=O)- \quad VIII$$

$$-Q-CH_2-CH(R^2)-O)_x-C_6H_4-S-CH_2-CH(R^2)-C(=O)-$$

$$-O-(CH_2-CH(R^2)-O)_\beta-R^3$$

$$CH(R)=C(R^1)-C(=O)-O-CH_2-CH_2-NH-C(=O)-Q-(CH_2)_n-O-C(=O)- \quad IX$$

$$-CH(R^2)-CH_2-S-\alpha$$

$$CH(R)=C(R^1)-C(=O)-O-CH_2-CH_2-NH-C(=O)- \quad X$$

$$-Q-C_6H_4-S-CH_2-CH(R^2)-C(=O)-$$

$$-O-(CH_2-CH(R^2)-O)_\beta-R^3$$

wherein
R is selected from hydrogen, methyl or phenyl radicals;
$R^1$ is selected from hydrogen, methyl or ethyl radicals;
$R^2$ is selected from hydrogen or methyl radicals;
$R^3$ is selected from hydrogen, alkyl radicals of 1 to 12 carbon atoms, phenyl and substituted phenyl radicals;
$R^4$ is an alkyl radical of 1 to 3 carbon atoms;
Q may be the same or different divalent radical selected from —O— or —NH—;
$\beta$ is 0 or a whole number from 1 to 20;
n is a whole number from 2 to 20;
m is 0 or 1 or 2;
x is a whole number from 1 to 20;
$\alpha$ is a monovalent radical selected from alkyl radicals of 1 to 30 carbon atoms, the radical $$-C_6H_4-R^5,$$

or the radical $$-CH_2-CH(R^2)-C(=O)-O-(CH_2-CH(R^2)-O)_\beta-R^3$$

wherein $R^2$, $R^3$ and $\beta$ are defined as above and $R^5$ is selected from hydrogen, hydroxyl and alkyl radicals of 1 to 10 carbon atoms.

* * * * *

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 3, structural formula II should read as follows:

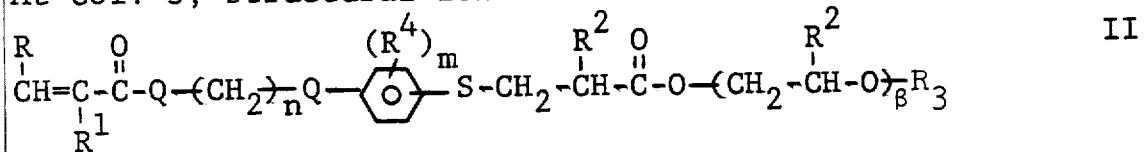

At Col. 3, structural formula V should read as follows:

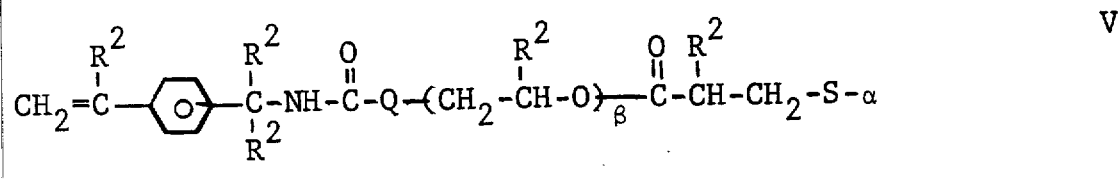

At Col. 3, structural formula VI should read as follows:

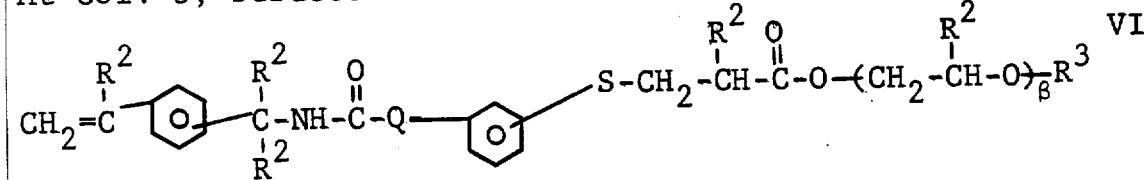

At Col. 3, structural formula X should read as follows:

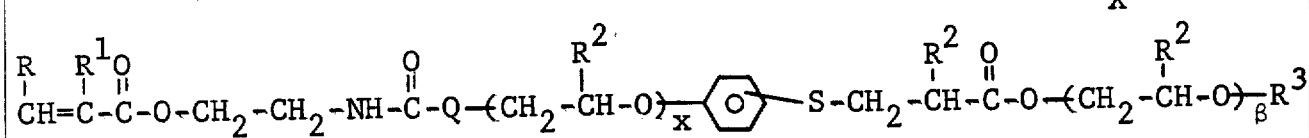

UNITED STATES PATENT AND TRADEMARK OFFICE
CERTIFICATE OF CORRECTION

PATENT NO. : 4,604,417

DATED : August 5, 1986

INVENTOR(S) : Cottman

It is certified that error appears in the above-identified patent and that said Letters Patent is hereby corrected as shown below:

At Col. 3, structural formula XII should read as follows:

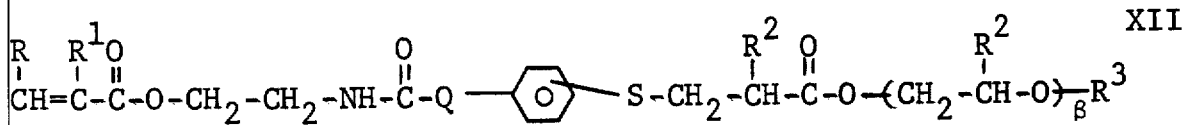

At Col. 3, line 59 delete "$R^3$ is selected from hydrogen, alkyl radicals of 1 to" and insert therefor --$R^3$ is selected from hydrogen, alkyl radicals of 1 to 12--.

At Col. 16, line 55 delete the word "of" and insert therefor --or--.

At Col. 22, structural formula II should read as follows:

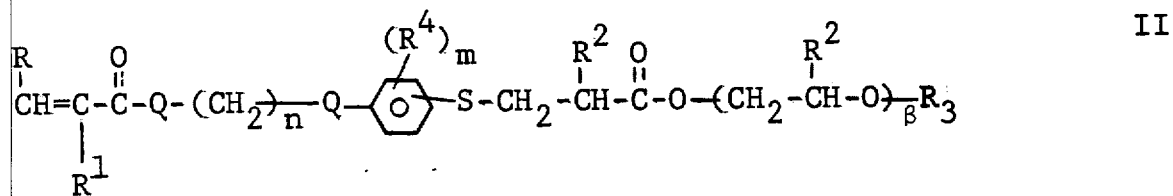

At Col. 23, structural formula X should read as follows:

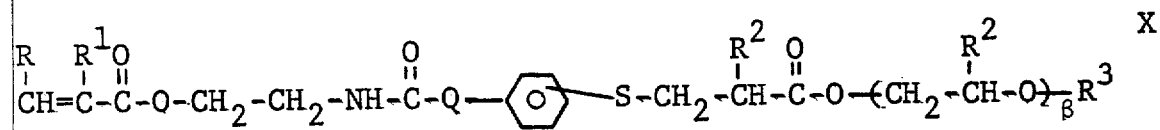

At Col. 23, structural formula XII should read as follows:

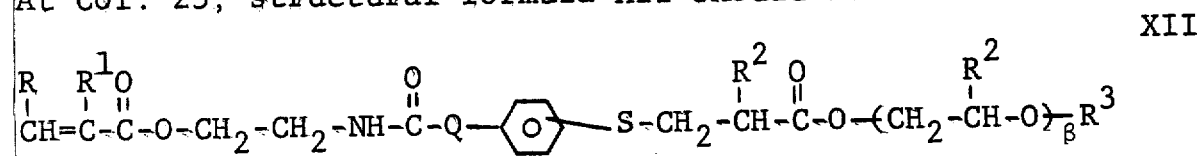

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 24, structural formula II should read as follows:

II

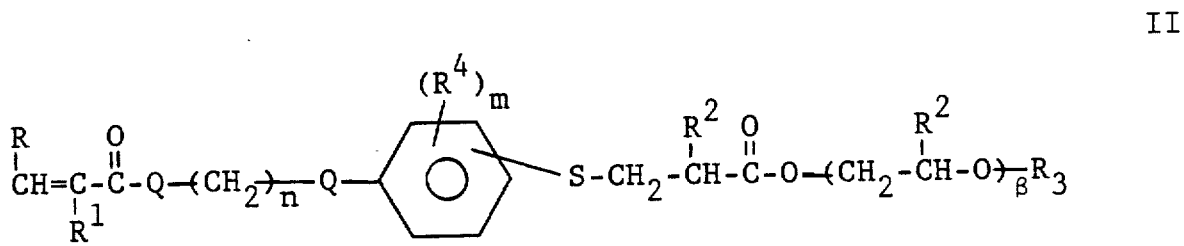

At Col. 25, structural formula III should read as follows:

III

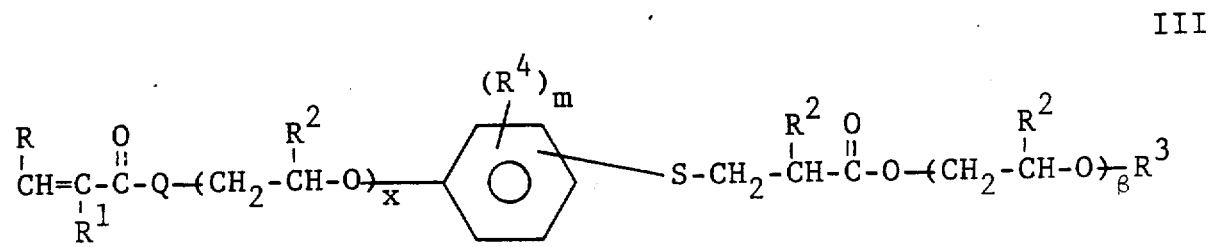

At Col. 25, structural formula IX should read as follows:

IX

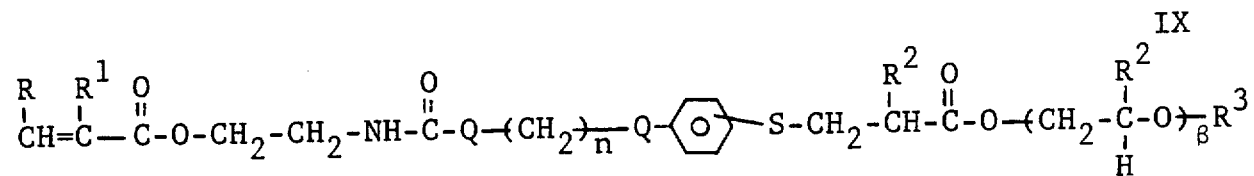

UNITED STATES PATENT AND TRADEMARK OFFICE
CERTIFICATE OF CORRECTION

PATENT NO. : 4,604,417  
DATED : August 5, 1986  
INVENTOR(S) : Cottman

Page 4 of 12

It is certified that error appears in the above-identified patent and that said Letters Patent is hereby corrected as shown below:

At Col. 25, structural formula X should read as follows:

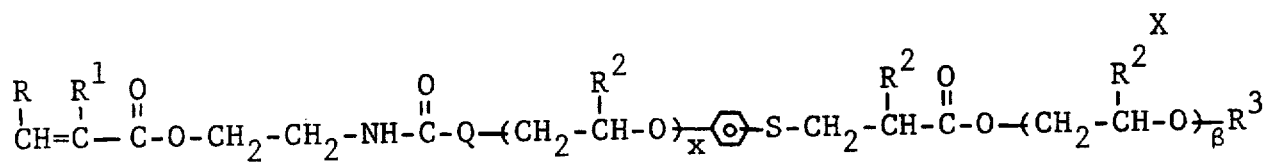

At Col. 25, structural formula XII should read as follows:

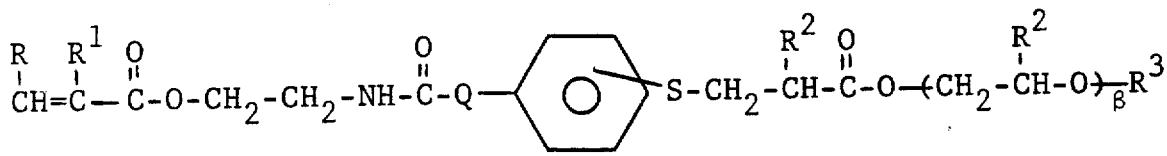

At Col. 27, structural formula II should read as follows:

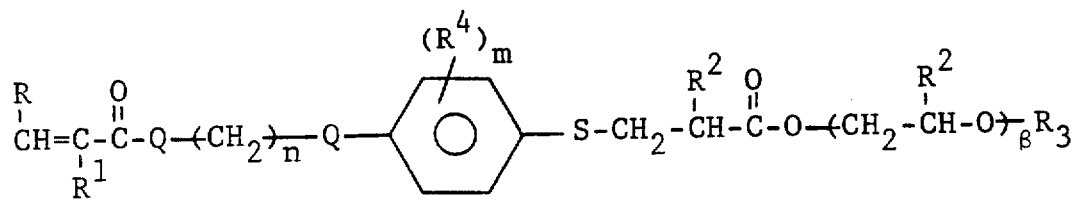

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 27, structural formula III should read as follows:

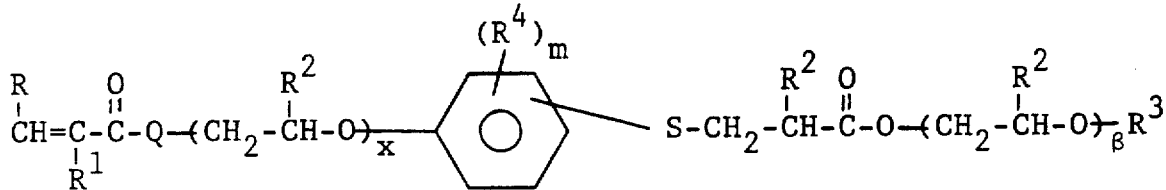

III

At Col. 27, structural formula IX should read as follows:

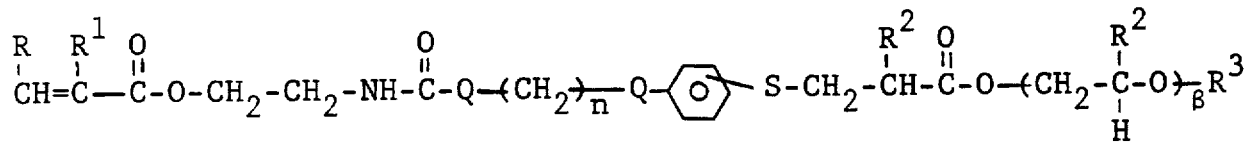

IX

At Col. 27, structural formula X should read as follows:

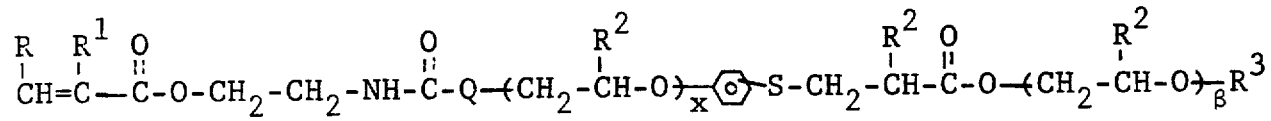

X

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 27, structural formula XII should read as follows:

XII

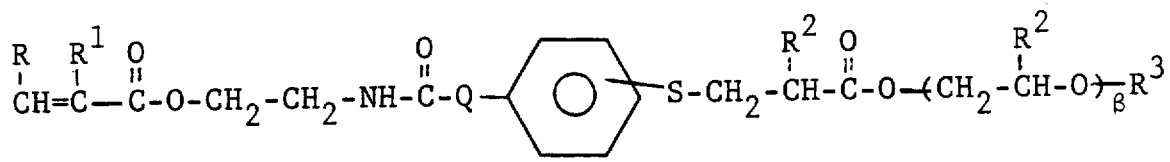

At Col. 29, structural formula II should read as follows:

II

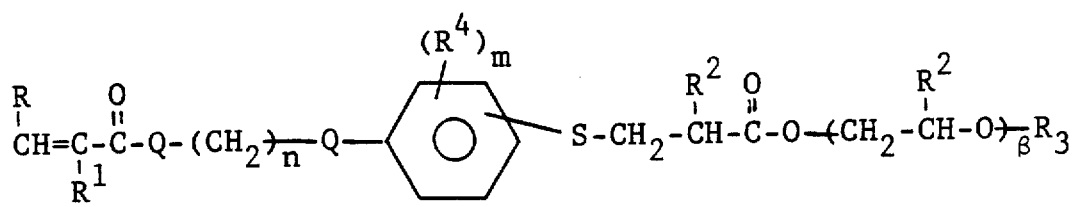

At Col. 29, structural formula III should read as follows:

III

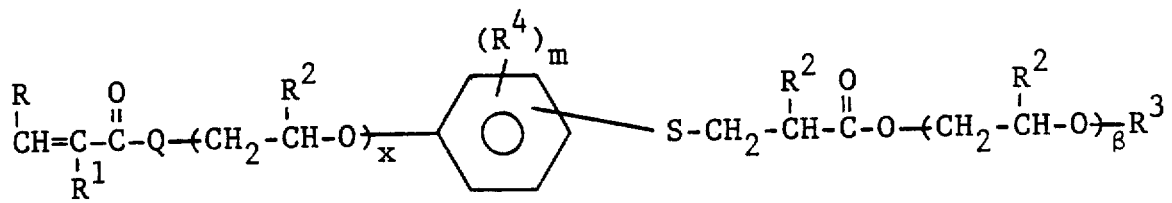

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 29, structural formula IX should read as follows:

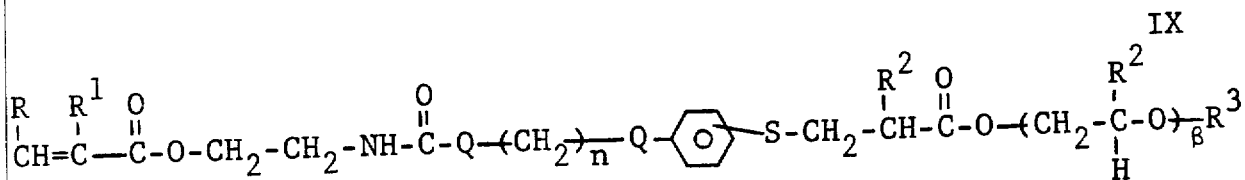

At Col. 29, structural formula X should read as follows:

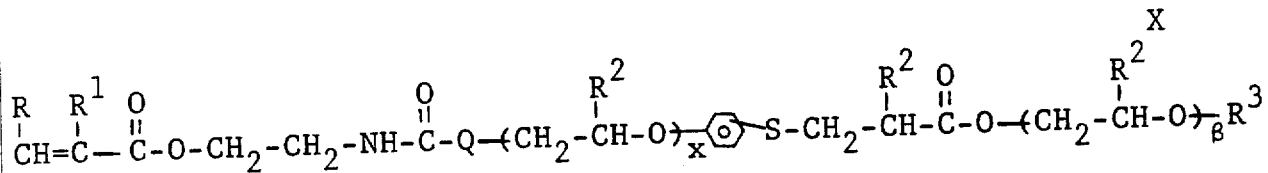

At Col. 29, structural formula XII should read as follows:

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 31, structural formula II should read as follows:

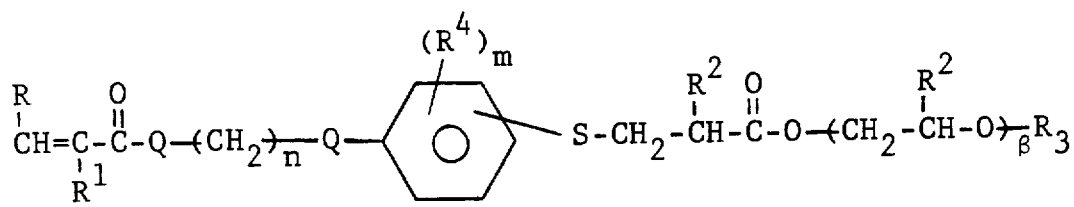

At Col. 31, structural formula III should read as follows:

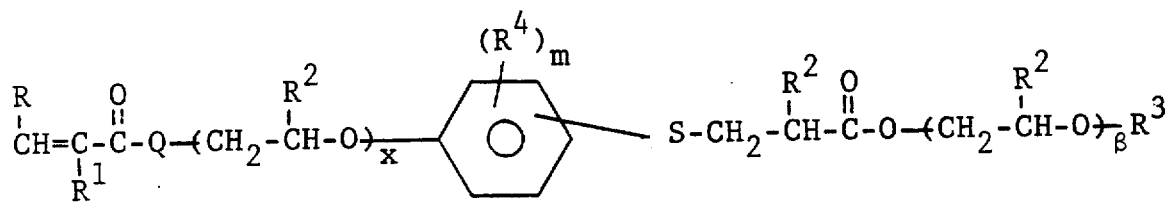

At Col. 31, structural formula IX should read as follows:

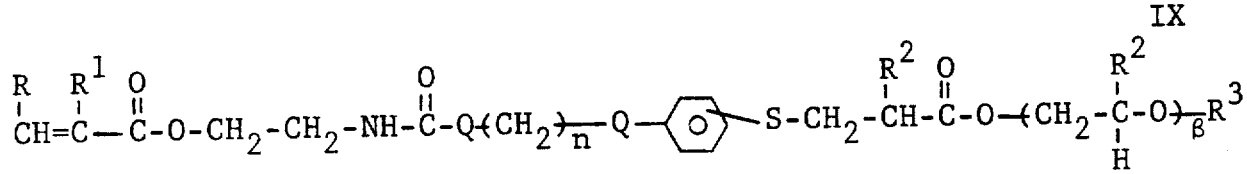

UNITED STATES PATENT AND TRADEMARK OFFICE
CERTIFICATE OF CORRECTION

PATENT NO. : 4,604,417

DATED : August 5, 1986

INVENTOR(S) : Cottman

It is certified that error appears in the above-identified patent and that said Letters Patent is hereby corrected as shown below:

At Col. 33, structural formula X should read as follows:

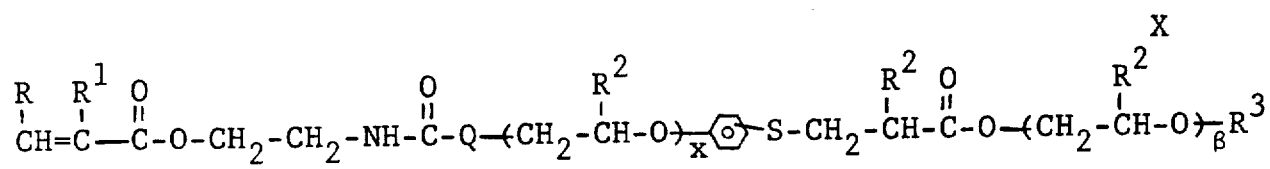

At Col. 33, structural formula XII should read as follows:

At Col. 34, structural formula III should read as follows:

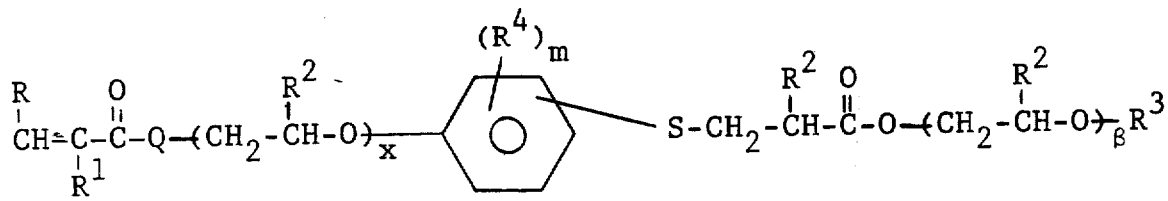

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 35, structural formula IX should read as follows:

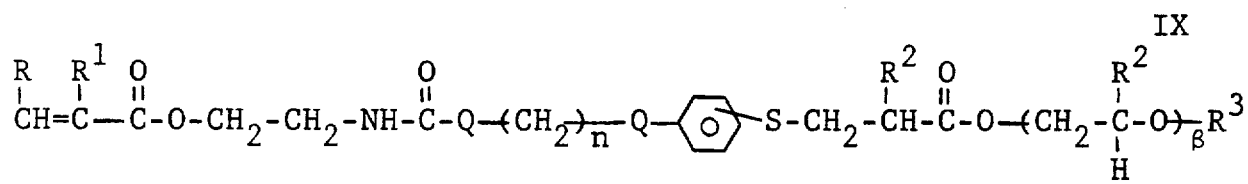

At Col. 35, structural formula X should read as follows:

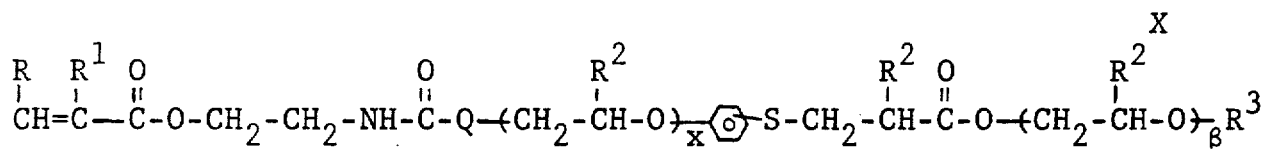

At Col. 35, structural formula XII should read as follows:

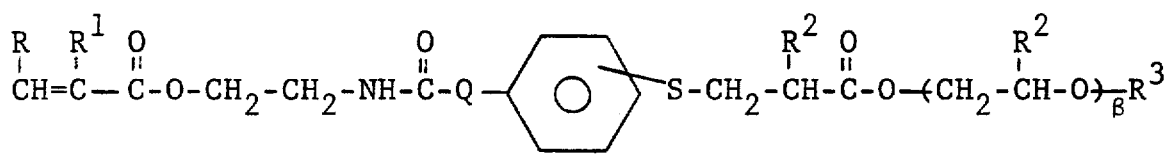

UNITED STATES PATENT AND TRADEMARK OFFICE
CERTIFICATE OF CORRECTION

PATENT NO. : 4,604,417
DATED : August 5, 1986
INVENTOR(S) : Cottman

It is certified that error appears in the above-identified patent and that said Letters Patent is hereby corrected as shown below:

At Col. 36, structural formula II should read as follows:

II

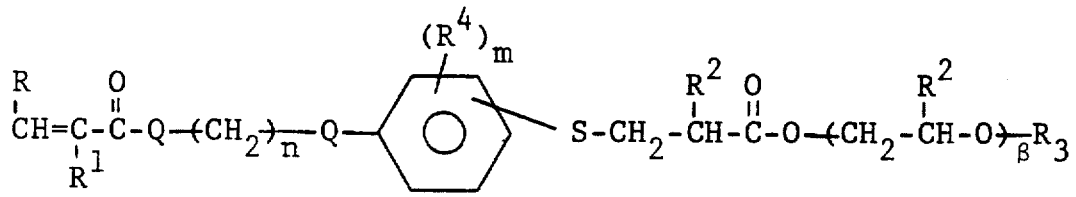

At Col. 36, structural formula III should read as follows:

III

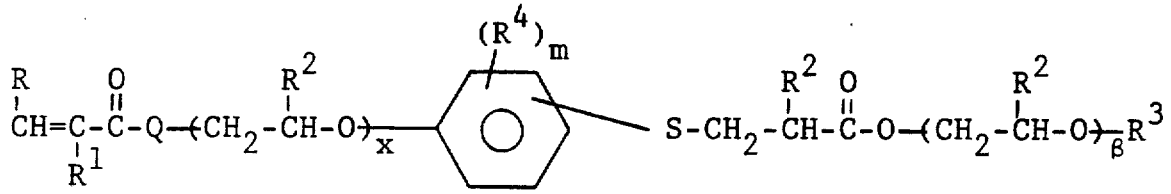

At Col 37, structural formula VII should read as follows:

VII

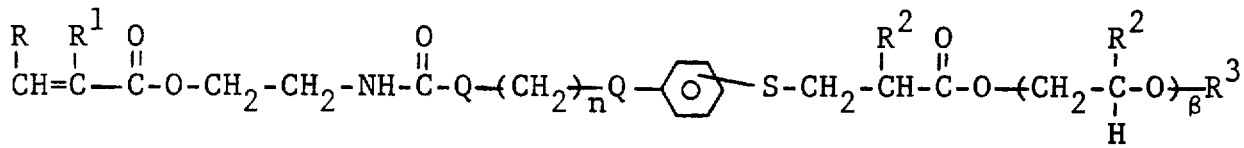

UNITED STATES PATENT AND TRADEMARK OFFICE
CERTIFICATE OF CORRECTION

PATENT NO. : 4,604,417

DATED : August 5, 1986

INVENTOR(S) : Cottman

It is certified that error appears in the above-identified patent and that said Letters Patent is hereby corrected as shown below:

At Col. 37, structural formula VIII should read as follows:

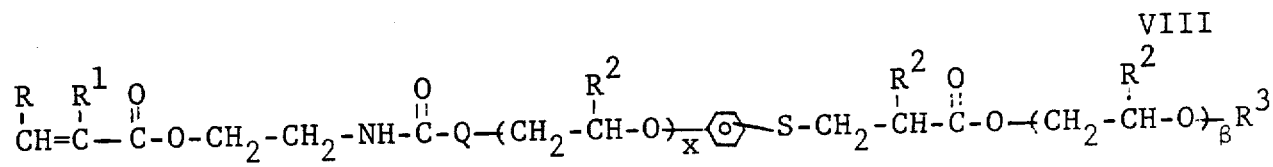

At Col. 38, structural formula X should read as follows:

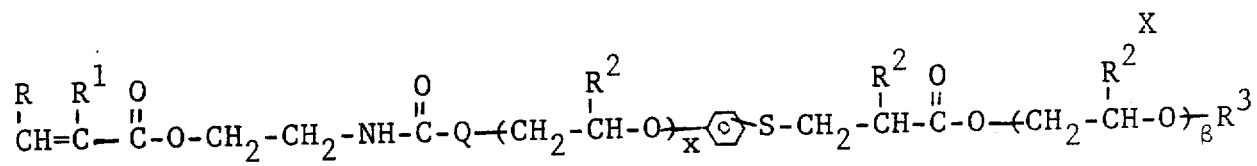

Signed and Sealed this

Fifth Day of April, 1988

*Attest:*

DONALD J. QUIGG

*Attesting Officer*     *Commissioner of Patents and Trademarks*